United States Patent
Koike et al.

(10) Patent No.: US 11,172,180 B2
(45) Date of Patent: Nov. 9, 2021

(54) CONTROL APPARATUS, CONTROL METHOD AND NON-TRANSITORY COMPUTER-READABLE MEDIUM

(71) Applicant: CANON KABUSHIKI KAISHA, Tokyo (JP)

(72) Inventors: Toru Koike, Tokyo (JP); Takayuki Sekine, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/573,078

(22) Filed: Sep. 17, 2019

(65) Prior Publication Data

US 2020/0092525 A1 Mar. 19, 2020

(30) Foreign Application Priority Data

Sep. 19, 2018 (JP) .............................. JP2018-175325
Jun. 7, 2019 (JP) .............................. JP2019-107221

(51) Int. Cl.
*H04N 9/31* (2006.01)

(52) U.S. Cl.
CPC ......... *H04N 9/3194* (2013.01); *H04N 9/3129* (2013.01); *H04N 9/3179* (2013.01)

(58) Field of Classification Search
CPC .................................. F16P 3/144; F16P 3/14
See application file for complete search history.

(56) References Cited

U.S. PATENT DOCUMENTS

| 6,002,505 A | 12/1999 | Kraenert et al. |
| 2005/0140832 A1 | 6/2005 | Goldman et al. |
| 2009/0262098 A1 | 10/2009 | Yamada |
| 2009/0295580 A1* | 12/2009 | Inoue ..................... B25J 9/0093 340/555 |
| 2014/0198030 A1 | 7/2014 | Takazawa |

(Continued)

FOREIGN PATENT DOCUMENTS

| CN | 104932756 A | 9/2015 |
| EP | 1406160 A2 | 4/2004 |
| JP | 2007053420 A | 3/2007 |

(Continued)

OTHER PUBLICATIONS

The above patent documents were cited in a European Search Report dated Feb. 3, 2020, that issued in the corresponding European Patent Application No. 19198017.6.

(Continued)

*Primary Examiner* — Samira Monshi
(74) *Attorney, Agent, or Firm* — Cowan, Liebowitz & Latman, P.C.

(57) ABSTRACT

A control apparatus includes: a determination unit configured to determine a target region; an output unit configured to output a predetermined light to the target region; a detection unit configured to detect intrusion of an object to the target region by detecting the predetermined light, wherein, in accordance that the intrusion of an object to the target region is detected by the detection unit in a state of outputting the predetermined light to a first region, the determination unit is further configured to determine a second region as the target region wherein the second region is larger than the first region.

14 Claims, 21 Drawing Sheets

(56) References Cited

U.S. PATENT DOCUMENTS

2017/0265034 A1*  9/2017  Yu ........................ G06F 1/3287
2019/0227523 A1*  7/2019  Shoji ...................... G01V 8/20

FOREIGN PATENT DOCUMENTS

| JP | 2012-058581 A | 3/2012 |
|----|---------------|--------|
| JP | 2012083871 A  | 4/2012 |
| WO | 2005/059736 A1 | 6/2005 |

OTHER PUBLICATIONS

The above documents were cited in a Jul. 23, 2021 Chinese Office Action, which is enclosed with an English Translation, that issued in Chinese Patent Application No. 201910887506.1.

* cited by examiner

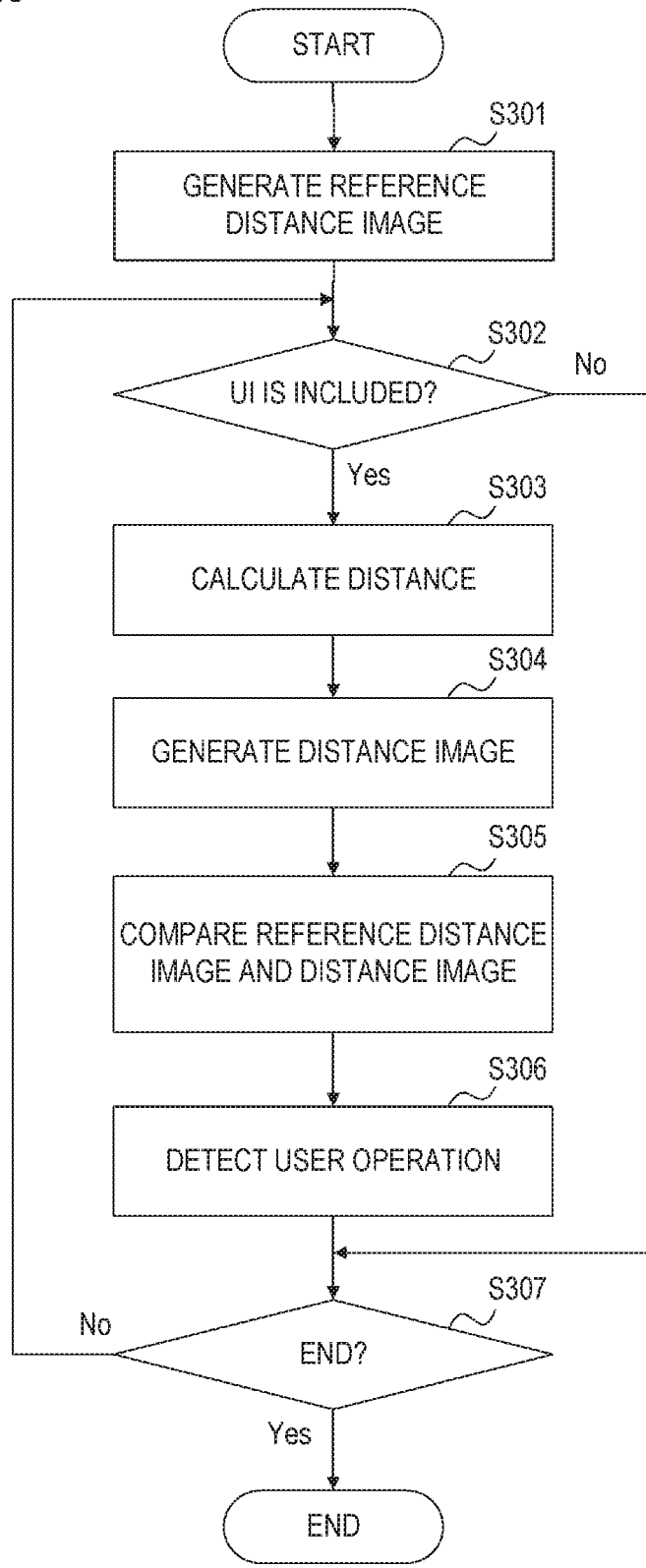

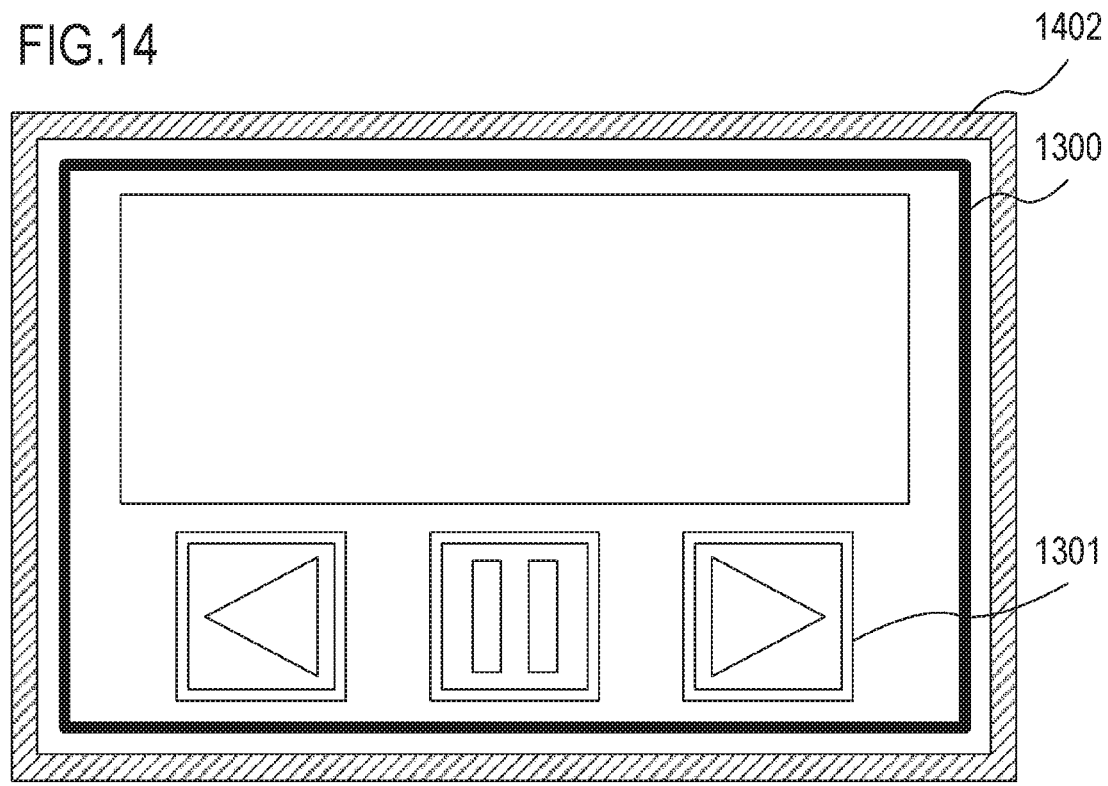

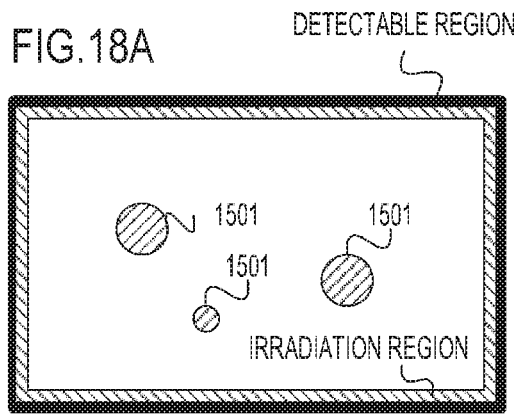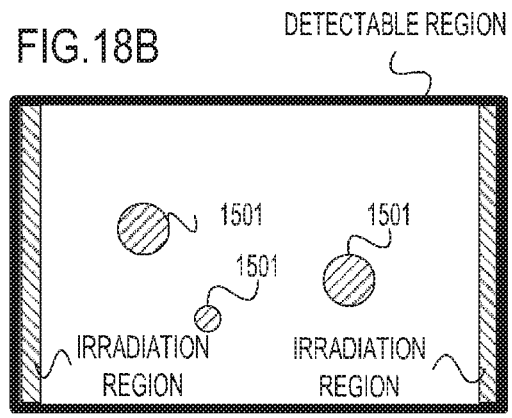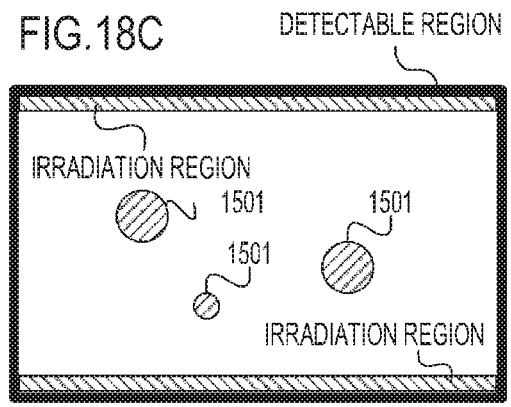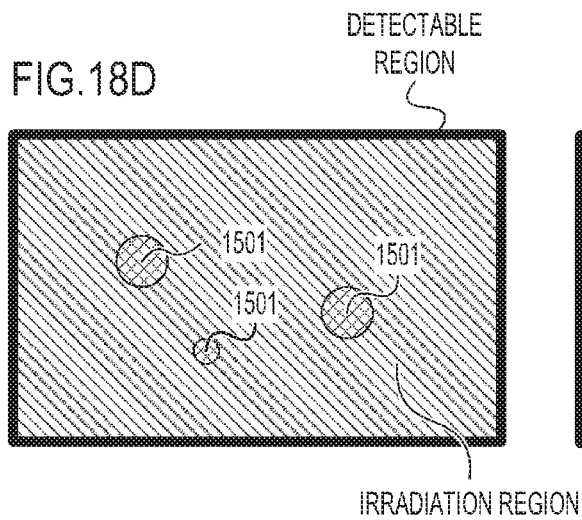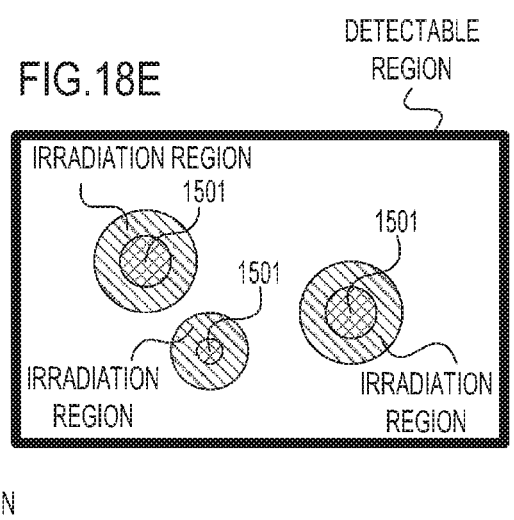

CONTROL APPARATUS, CONTROL METHOD AND NON-TRANSITORY COMPUTER-READABLE MEDIUM

BACKGROUND OF THE INVENTION

Field of the Invention

The present invention relates to a control apparatus, a control method and a non-transitory computer-readable medium.

Description of the Related Art

Some projection apparatuses (projectors) can detect an operation that the user performs near an image projected by the projection apparatus.

Japanese Patent Application Publication No. 2012-58581 discloses a laser scanning type projector that includes laser light sources that emit visible light of red (R), green (G), blue (B) and the like, and a laser light source that emits invisible light, such as infrared. This type of projector detects user operation by detecting reflected light of projected invisible light.

SUMMARY OF THE INVENTION

The present invention in its first aspect provides a control apparatus includes:
  a determination unit configured to determine a target region;
  an output unit configured to output a predetermined light to the target region:
  a detection unit configured to detect intrusion of an object to the target region by detecting the predetermined light,
  wherein, in accordance that the intrusion of an object to the target region is detected by the detection unit in a state of outputting the predetermined light to a first region, the determination unit is further configured to determine a second region as the target region wherein the second region is larger than the first region.

The present invention in its second aspect provides a control method includes:
  determining a target region;
  outputting a predetermined light to the target region;
  detecting intrusion of an object to the target region by detecting the predetermined light; and
  in accordance that the intrusion of an object to the target region is detected by the detection unit in a state of outputting the predetermined light to a first region, determining a second region as the target region wherein the second region is larger than the first region.

The present invention in its third aspect provides a non-transitory computer readable medium that stores a program, wherein the program causes a computer to execute the above method.

According to the present invention, it is possible to reduce the power consumption of the control apparatus which outputs predetermined light.

Further features of the present invention will become apparent from the following description of exemplary embodiments with reference to the attached drawings.

BRIEF DESCRIPTION OF THE DRAWINGS

FIG. 3 is a flow chart depicting an example of image projection processing.

FIG. 7A is a conceptual diagram depicting a reference distance image:

FIG. 7B is a conceptual diagram depicting a distance image;

FIG. 7C is a conceptual diagram depicting a difference image; and

FIG. 14 is a diagram depicting an example of an invisible light projection region:

FIG. 18A to FIG. 18E are diagrams depicting an irradiation region of invisible light.

DESCRIPTION OF THE EMBODIMENTS

First Embodiment

A projection apparatus 100 according to this embodiment will be described. The projection apparatus 100 according to this embodiment is an electronic apparatus that can project an image (projection image) to a projection region on a projection surface using visible light of red (R), green (G) and blue (B). The projection apparatus 100 also radiates (projects) infrared laser light (invisible light) to a region where a user interface (UI) included in the projection image is displayed. Further, the projection apparatus 100 detects the presence of the user, operation by the user, gesture of the user and the like based on the irradiation timing of the invisible light and the timing of receiving the light (reflected light) generated when the invisible light is reflected on the projection surface and objects (e.g. user). The projection apparatus 100 executes predetermined processing based on the detected result.

The projection apparatus 100 according to this embodiment controls a region to when the invisible light is projected, based on the information to indicate the position of the UI of the projection image, so that the region to which the invisible light is projected becomes smaller than the region to which the projection image is projected using visible light (projection region). A general configuration and processing content of the projection apparatus 100 of this embodiment will be described in sequence.

Figure 1:
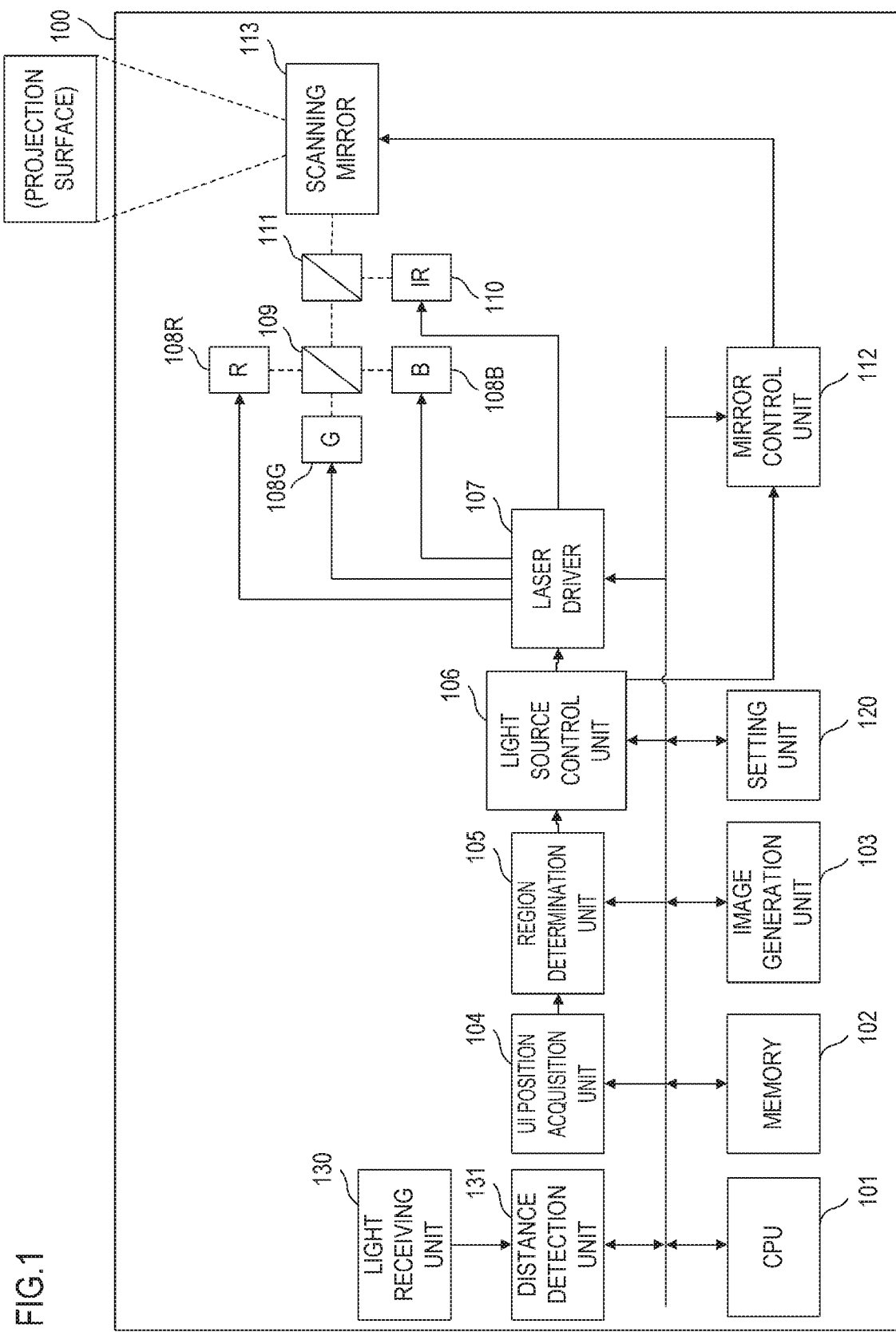
FIG. 1 is a block diagram depicting an example of a projection apparatus.

FIG. 1 is a block diagram depicting the projection apparatus 100 according to a first embodiment. The projection apparatus 100 is an information processing apparatus (computer) which includes an arithmetic unit (processor), a memory, a storage device and an input/output device. The later mentioned functions of the projection apparatus 100 are provided by the projection apparatus 100 executing programs stored in the storage device. A part or all of these functions may be implemented by a dedicated logic circuit, such as an ASIC and FPGA. The projection apparatus 100 may be regarded as a projector (electronic apparatus) which includes the functions of a personal computer, smartphone or the like.

A CPU 101 controls operation of each functional unit of the projection apparatus 100 by executing a program stored in a later mentioned memory 102. Further, the CPU 101 executes an application stored in the memory 102.

The memory 102 is a storage medium that stores programs to be executed by the CPU 101 and image data.

An image generation unit 103 is a functional unit which generates projection image data in accordance with a request from the CPU 101. In the first embodiment, an example when the projection image includes a user interface image (hereafter UI image) for the user to perform operation will be described.

A UI position acquisition unit 104 is a functional unit that acquires information to specify the position of the UI image in the projection image data (UI position information). The UI position acquisition unit 104 extracts shape information of the UI image.

A region determination unit 105 is a functional unit that determines a region to which infrared laser light is projected (infrared projection region). The region determination unit 105 also outputs information on the determined infrared projection region (infrared projection region information) to a later mentioned light source control unit 106. The region determination unit 105 acquires information to specify a position of the UI image in the projection image data (UI position information) from the UI position acquisition unit 104. The UI position information can be acquired from the image generation unit 103. The method of generating the infrared projection region information will be described later. The projection apparatus 100 according to the first embodiment projects invisible light when a UI image exists (position information or the like can be acquired) in the projection image.

The light source control unit 106 generates light source control signals for controlling laser light sources 108R, 108G and 108B to output visual light and an infrared laser light source IR based on the projection image data and the infrared projection region information. The projection image data may be projection image data read from the memory 102. The light source control unit 106 generates light source control signals for three visible light sources of red (R), green (G) and blue (B) and an invisible light source of infrared (IR). The light source control unit 106 also generates synchronization signals (vertical synchronization signal, horizontal synchronization signal) to control a scanning mirror (MEMS) in order to scan the laser light outputted from each laser light source on the projection surface, and outputs the synchronization signals to a mirror control unit 112.

A laser driver 107 outputs the driving current of each laser light source based on the light source control signal outputted from the light source control unit 106. In concrete terms, the laser driver 107 modulates the driving current of the laser light source corresponding to each light control signal, and outputs the driving current to the laser light sources 108R, 108G and 108B and the infrared laser light source 110 respectively.

Laser light sources 108R, 108G and 108B are visible light sources which emit each laser light based on the driving current supplied from the laser driver 107. The laser light source 108R emits the red laser light (R), the laser light source 108G emits the green laser light (G), and the laser light source 108B emits the blue laser light (B).

A dichroic mirror 109 has a characteristic of reflecting light having a specific wavelength and transmitting light having other wavelengths. The dichroic mirror 109 according to the first embodiment combines laser light of each color emitted from the three laser light sources 108R, 108G and 108B utilizing this characteristic, so as to output laser light containing the red light, green light and blue light components.

An infrared laser light source 110 is an invisible light source which emits infrared laser light based on the driving current supplied from the laser driver 107.

A dichroic mirror 111 combines the laser light combined by the dichroic mirror 109 and the infrared laser light emitted from the infrared laser light source 110, and outputs laser light containing the red light, green light, blue light and infrared light components.

A mirror control unit 112 is a functional unit that generates a driving signal, for driving a scanning mirror in a predetermined angle range in the horizontal direction and vertical direction, based on the horizontal and vertical synchronization signals outputted from the light source control unit 106, and supplies the driving signal to the scanning mirror 113. The angle range may be a fixed value and stored in the memory 102 in advance.

The scanning mirror 113 is a reflection member that reflects laser light emitted from the dichroic mirror 111, so as to change the direction of the optical path toward the projection surface. By changing the angle of the reflection surface of the scanning mirror 113 by the mirror control unit 112, the laser light reflected by the scanning mirror 113 can scan the projection surface (two-dimensional scanning). The projection apparatus 100 according to the first embodiment performs image projection by the laser scanning method, but the image projection method is not especially limited, and the image projection may be performed by the laser projection method or by using a liquid crystal panel. For projection, the projection apparatus uses the laser light source, the laser driver, the dichroic mirror, the mirror control unit, the scanning mirror and the like, but may use a light source unit, a light source control unit, a liquid crystal control unit, a liquid crystal element and the like instead.

A setting unit 120 is a functional unit that changes the setting of the projection apparatus 100. In the first embodiment, the setting unit 120 inputs an operation signal based on the user operation to change the setting of the projection apparatus 100.

A light receiving unit 130 is a functional unit that detects infrared laser light that is emitted from the infrared laser light source 110 and is reflected on a projection plane (projection surface or object). For the light receiving unit 130, a photo diode, a two-dimensional sensor or the like can be used, for example.

A distance detection unit 131 is a functional unit that calculates the distance to the projection surface based on the infrared laser light emitted from the infrared laser light source 110 and the infrared laser light (reflected light)

detected by the light receiving unit 130. For example, the distance detection unit 131 detects the distance by the time of flight (TOF) method. In concrete terms, the distance detection unit 131 calculates the distance by measuring the time, from the infrared laser light source 110 emitting the infrared laser light to the light receiving unit 130 detecting the infrared laser light. The distance measurement method used by the distance detection unit 131 is not limited to the above, as long as the distance between the projection apparatus 100 and the projection surface can be measured. The distance calculation will be described in detail later.

The image generation unit 103, the UI position acquisition unit 104, the region determination unit 105 and so on may be functional units implemented by the CPU 101.

Figure 2:
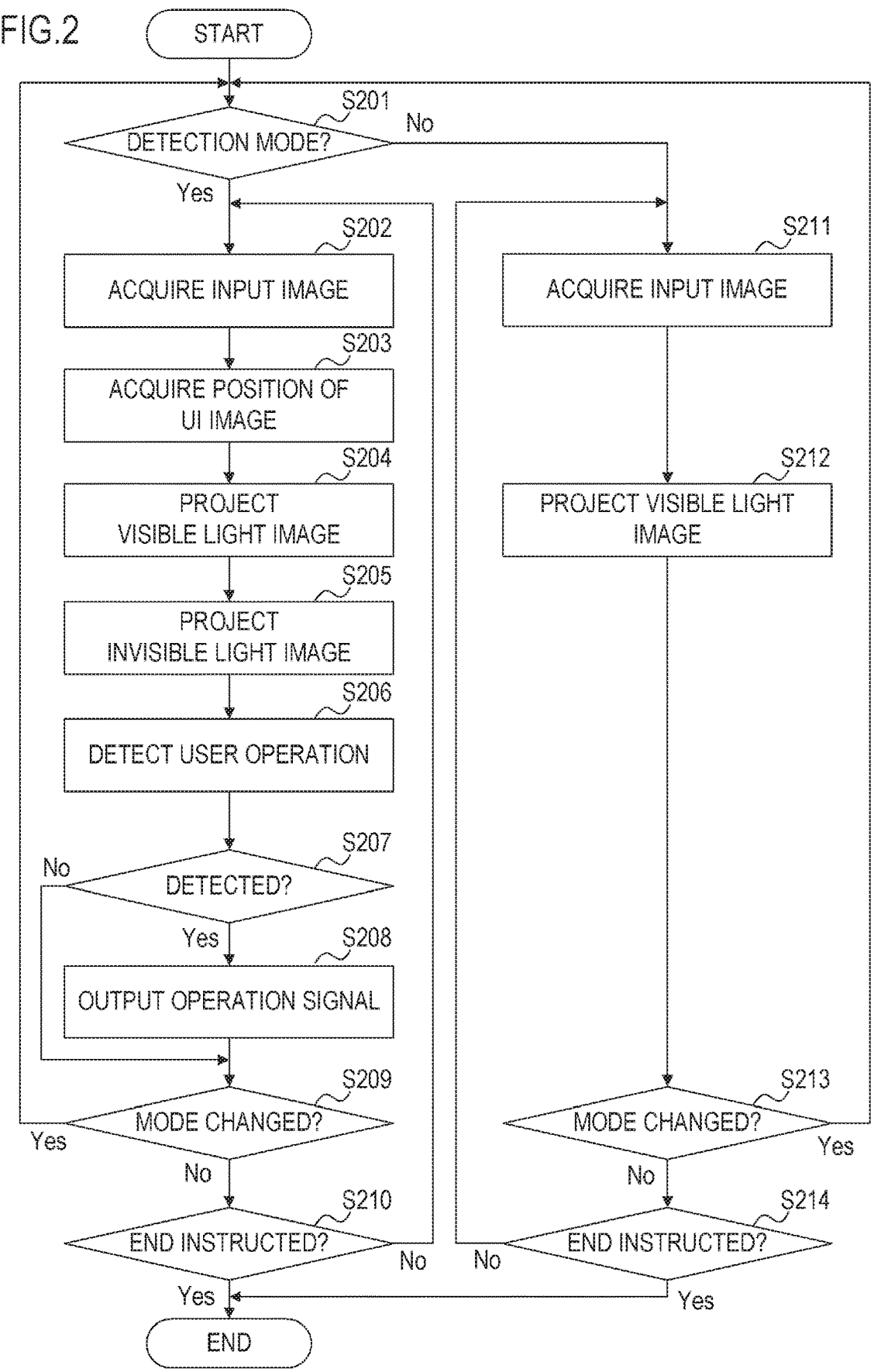
FIG. 2 is a flow chart depicting an example of image projection processing.

FIG. 2 is a flow chart depicting a processing content of the projection apparatus 100 according to this embodiment. The processing in FIG. 2 is started when the projection apparatus 100 is started, and the initial setting is completed.

In S201, the CPU 101 determines whether the operation detection mode, which is a mode to detect the user operation, is enabled. Processing advances to S202 if the operation detection mode is enabled, or to S211 if not. Information to indicate ON (enabled)/OFF (disabled) of the operation detection mode can be read from the memory 102. The operation detection mode can be set by the user via an operation unit (not illustrated).

In S202, the image generation unit 103 acquires (generates) the projection image data to project a visible light image on the projection surface. In this embodiment, the projection image data is an image data read from the memory 102, but may be an image inputted from an external apparatus. In the case where the projection apparatus 100 projects the projection image data with superimposing the UI image (operation image) which is an image for operation, the image generation unit 103 executes the processing to combine the UI image data with the projection image data.

In S203, the UI position acquisition unit 104 acquires the UI position information to specify the position of the UI image in the projection image data. Here a region corresponding to the UI image indicates a region of the projection image where the UI image is displayed. The UI position information is coordinate information which indicates the center position of the UI image in the projection image data, and pattern information which indicates the shape of the UI image, for example. The UI position information may be image data (invisible light image data) of which the region corresponding to the UI image has a predetermined gradation value, and other regions have gradation value 0.

In S204, the light source control unit 106, the laser driver 107 and the mirror control unit 112 project the projection image, which is based on the projection image data to the projection surface using the visible light. Based on the gradation values of R, G and B of each pixel of the projection image data, the light source control unit 106 determines the light source control signal, which indicates the intensity of the laser light corresponding to the laser light source 108R, 108G or 108B respectively. The light source control unit 106 generates a synchronization signal based on the projection image data, and outputs the synchronization signal to the mirror control unit 112. Based on the light source control signal, the laser driver 107 generates the driving signal for each laser light source 108, and outputs the driving signal to each laser light source 108. Each laser light source 108 outputs the laser light based on the inputted driving signal.

The mirror control unit 112 controls the angle (reflection angle) of the scanning mirror 113, so that a position of the projection surface corresponding to the position of each pixel is irradiated with the laser light emitted at a power corresponding to the pixel value of the pixel. The scanning mirror 113 is controlled so that the reflection angle with respect to the horizontal direction of the image cyclically vibrates at a resonance frequency, and the reflection angle with respect to the vertical direction of the image cyclically vibrates at a frequency corresponding to the frame rate. The vibration of the scanning mirror 113 in the vertical direction is controlled so as to synchronize with the synchronization signal acquired from the light source control unit 106. Further, the light source control unit 106 and the laser driver 107 control the output timing and intensity of the laser light so that output, corresponding to one line of pixels in the horizontal direction, completes synchronizing with the resonance frequency of the scanning mirror 113 in the horizontal direction. By controlling the output intensity, output timing and scanning direction of each laser based on the projection image data, the projection image by the visible light is projected to the projection region on the projection surface.

In S205, the light source control unit 106, the laser driver 107 and the mirror control unit 112 project the invisible light to the projection surface based on the infrared projection region information. Based on the infrared projection region information, the light source control unit 106 controls the output intensity, output timing and scanning direction of the infrared laser light source 110, so that the invisible light is projected to a region including the UI image, out of the projection image projected to the projection region. The light source control unit 106 controls the output timing and intensity of the laser light of the invisible light, so that only a region corresponding to the UI image, which is narrower (e.g. surface area is smaller) than the projection region, out of the projection region on the projection surface is irradiated with the invisible light. As mentioned above, if the invisible light image data is generated, the output intensity of the infrared laser light may be controlled based on the invisible light image data. By irradiating only a region which is narrower than the projection region to which the projection image is projected with the invisible light, the power consumption can be reduced compared with the case of irradiating the entire surface of the projection image (projection region) with the invisible light. The region irradiated with the invisible light may not be a region which includes only the UI image, but may be a region which includes the UI image and the vicinity thereof.

In S206, the CPU 101 detects user operation. The projection apparatus 100 according to the first embodiment detects the distance between the projection apparatus 100 and the projection surface or the object by the time of flight (TOF) method, and detects the user operation based on the change of this distance. The method of detecting the user operation will be described later.

In S207, the CPU 101 determines whether the user operation was performed. Processing advances to S208 if the user operation was detected in S206, or to S209 if not.

In S208, the CPU 101 outputs an operation signal to execute the processing corresponding to the user operation, responding to the detection of the user operation. The operation signal is determined in advance corresponding to the UI image to be projected. For example, when a user operation is detected, the CPU 101 outputs a signal to control the image generation unit 103, so as to execute the processing to change the projection image (change the projection image data). The CPU 101 also outputs an operation signal to change the setting of the projection apparatus 100 to the setting unit. In other words, when the user executed a predetermined operation on the UI image, which is an operation image associated with predetermined processing that the projection apparatus 100 can execute, the CPU 101 executes predetermined processing, which is corresponded to the UI image in advance.

The operation signal may be outputted to an external apparatus. For example, in the case where an image is projected based on the image data inputted from an external apparatus, an operation signal, to instruct page forward/return or the like, may be outputted to the external apparatus.

In the above description, an example of executing processing in the sequence of the projecting the visible light image, radiating the invisible light and detecting the user operation was described, but the execution sequence is not limited to this. For example, the visible laser light and the invisible laser light may be outputted synchronizing with the scanning using a common scanning mirror. In the case of the visible laser light, the scanning in the vertical direction is executed at a frequency that is four times the frame rate, but in the case of the invisible laser light, the scanning of the mirror is controlled at a frequency corresponding to the frame rate.

In S209, the CPU 101 determines whether the detection mode was changed from enable to disable by the user during the image projection. Processing advances to S201 if the detection mode was changed, or to S210 if not.

In S210, the CPU 101 determines whether operation to end the image projection was performed by the user. Processing ends if the end operation was performed, or returns to S202 if not. For example, the CPU 101 determines that the end operation was performed when an instruction to end the image projection, an instruction to turn the power OFF or the like is received from the user.

Description on the processing in S211 and S212, which are the same as S202 and S204, is omitted.

In S213, the CPU 101 determines whether the detection mode was changed from disable to enable by the user during the image projection. Processing returns to S201 if the detection mode was changed, or advances to S214 if not.

In S214, the CPU 101 determines whether operation to end the image projection was performed by the user. Processing ends if the end operation was performed, or returns to S211 if not. For example, the CPU 101 determines that the end operation was performed when the instruction to end the image projection, the operation to turn the power OFF or the like is received from the user.

[User Operation Extraction Processing]

The processing to extract a user operation will be described next with reference to the flow chart in FIG. 3.

Figure 7A:
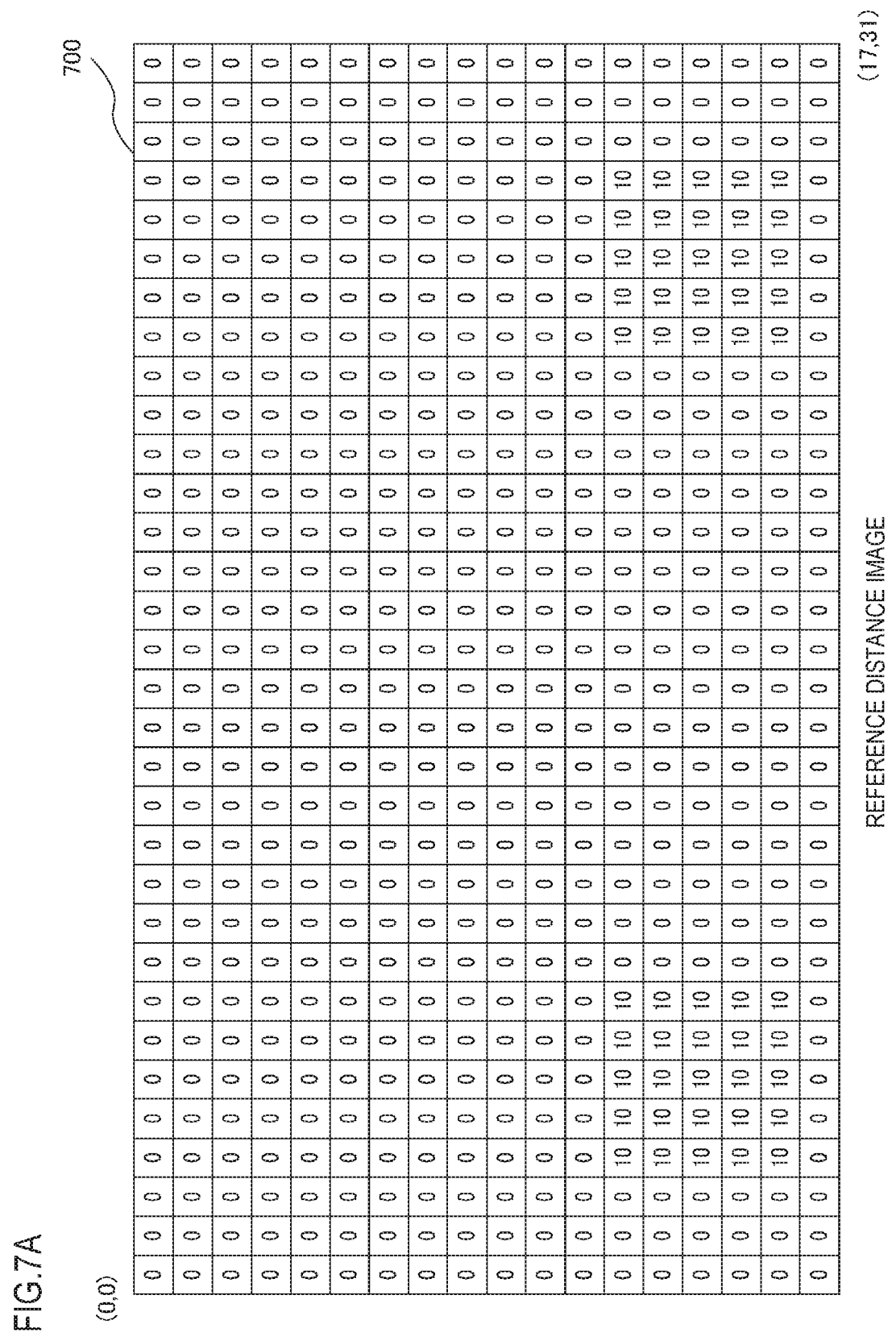

In S301, the distance detection unit 131 measures a distance for each pixel of the projection image in a state where an obstacle (object) does not exist between the projection apparatus 100 and the projection surface. In concrete terms, the distance is measured by detecting the reflected light of the projected infrared laser light. Then the distance detection unit 131 generates a reference distance image, which is an image indicating the distance information corresponding to each pixel of the projection image. Each pixel value of the reference distance image is a distance detected by the distance detection unit 131 (FIG. 7A). The generated reference distance image is stored in the memory 102. The reference distance image may be generated only once when the projection apparatus 100 is started up. The distance detection unit 131 may measure the distance only for a part of the pixels of the projection image.

In S302, the CPU 101 determines whether the UI image is included in the projection image. Processing advances to S303 if it is determined that the UI image is included in the projection image, or to S307 if not.

In S303, the distance detection unit 131 detects the distance from the projection apparatus 100 to the projection surface or to the obstacle in the same manner as the processing in S301.

In S304, the CPU 101 generates a distance image based on the distances determined by the distance detection unit 131. The generation of the distance image will be described later.

In S305, the CPU 101 generates a difference image (difference data) by comparing each pixel value between the distance image and the reference distance image.

In S306, the CPU 101 detects the user operation in a region corresponding to the UI image based on the difference image and the projection image. For example, as the user operation, the CPU 101 detects a touch operation to a button displayed on the projection image. Then the CPU 101 determines that the touch operation was performed when the distance in the region corresponding to the UI image in the difference image decreases, then increases, and then decreases again, for example.

In S307, the CPU 101 determines whether the user operation (UI operation) extraction processing is ended. Processing returns to S302 if it is determined that the extraction processing is continued, or processing ends if not. The user operation extraction processing may be performed simultaneously with the image projection processing, as processing separate from the image projection processing.

[Infrared Projection Region Calculation Method]

Figure 4A:
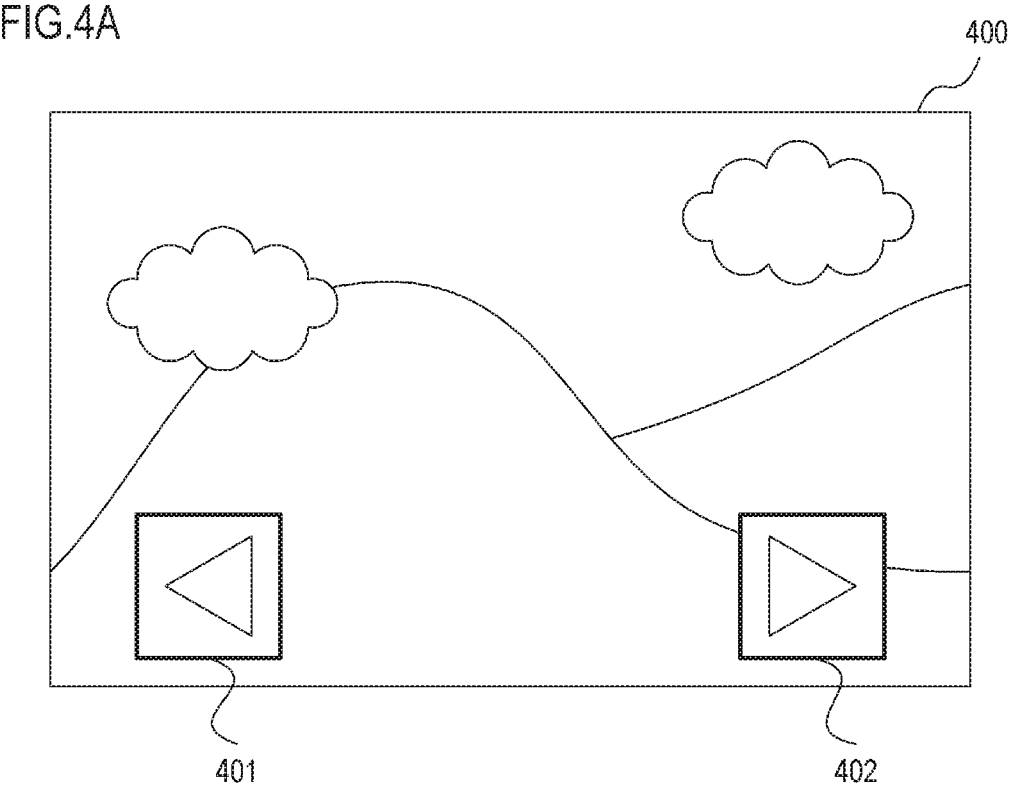
FIG. 4A and FIG. 4B are conceptual diagrams depicting a method of calculating an invisible light projection region.
Figure 4B:
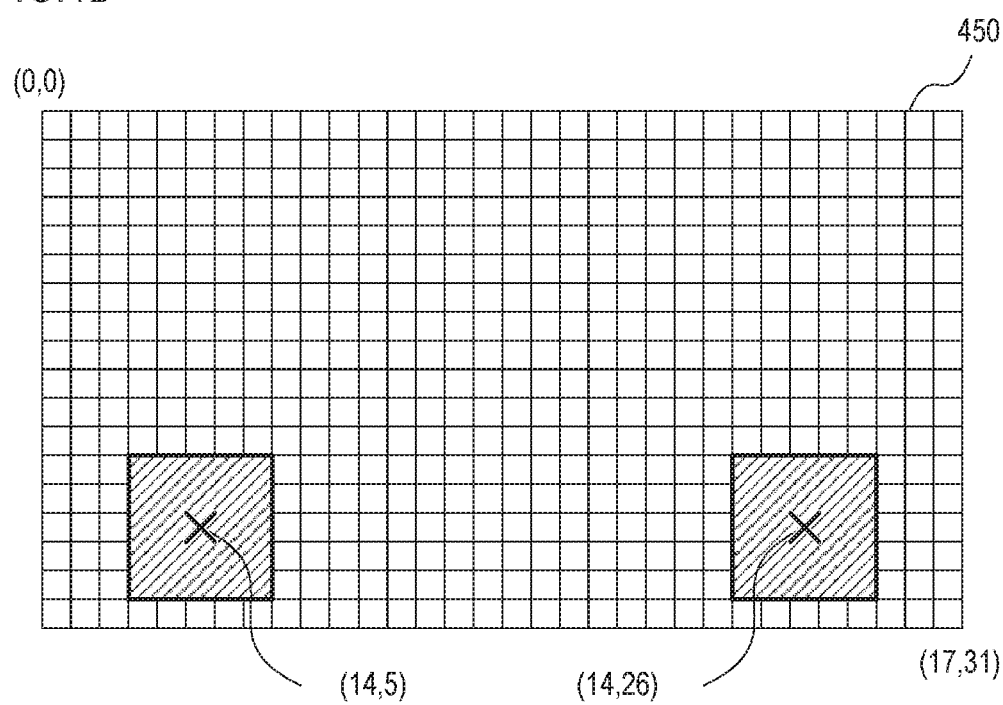

FIG. 4A and FIG. 4B are conceptual diagrams depicting a method of calculating an infrared projection region according to the first embodiment.

FIG. 4A is a schematic diagram depicting projection image data. The projection image data is image data constituted of a plurality of pixels (32 pixels in the horizontal direction, 18 pixels in the vertical direction). The projection image 400 includes a UI 401 and a UI 402. The UI 401 and the UI 402 are generated by the image generation unit 103 in advance. In the projection image 400, the coordinates of the pixel at the upper left corner are (0, 0), and the coordinates of the pixel at the lower right corner are (17, 31).

FIG. 4B indicates infrared projection region information 450 which indicates a region which is irradiated with the infrared laser light out of the projection image 400. In the first embodiment, the infrared projection region information 450 is image data which indicates a region which is irradiated with invisible light. The region determination unit 105 receives coordinates of the center positions of the UI 401 and the UI 402 and the shape information of the UI images from the UI position acquisition unit 104. For example, the coordinates of the center position of the UI 401 are (14, 5), and the shape information of the UI 401 is a 5×5 rectangle. The coordinates of the center position of the UI 402 are (14, 26), and the shape of the UI 402 is a 5×5 rectangle. Then the region determination unit 105 sets the values of the pixels in the regions corresponding to the positions of the UI 401 and the UI 402 (slashed regions in FIG. 4B) to 1, and the values of the other pixels to 0, so as to generate the infrared projection region information 450. In other words, the portion in which the pixel values are 1, out of the infrared projection region information 450, is the infrared projection region.

Figure 5:
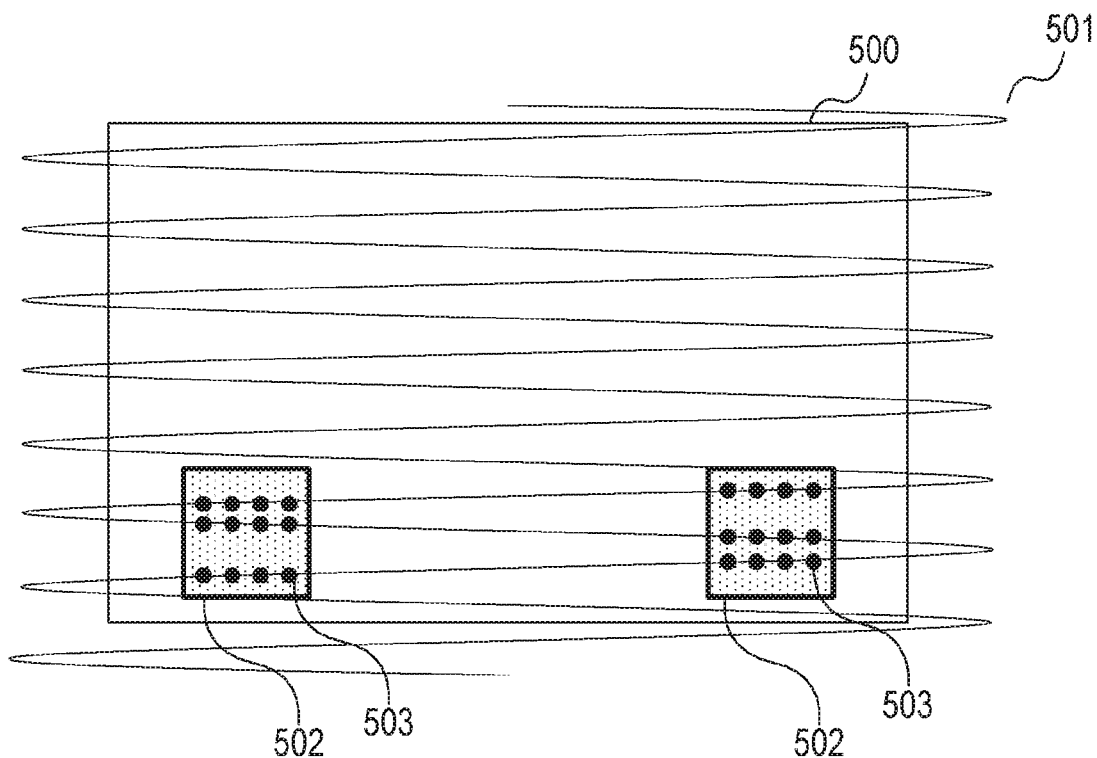
FIG. 5 is a conceptual diagram depicting an invisible light projection region.

FIG. 5 is a conceptual diagram depicting a projection region of the infrared laser light according to this embodiment. The scanning mirror 113 scans the laser light, generated by combining the light from the laser light sources 108R, 108G and 108B and the infrared laser light source 110, on the two-dimensional scanning line 501, so as to project composite light. The two-dimensional scanning line 501 in FIG. 5 is indicated by allowing large intervals between the scanning lines, but this is for description, and actual intervals are small enough to project the resolution of the image.

The light source control unit 106 modulates the laser light sources 108R, 108G and 108B based on the projection image 500, and turns the laser light ON on the two-dimensional scanning line 501 corresponding to the image. Further, the light source control unit 106 controls the infrared laser light source 110 so that a point 503, which is a point where the two-dimensional scanning line 501 and the UI region 502 (region where the UI image is displayed) overlap, is irradiated with the infrared light using the infrared projection region information 450. In this way, the projection apparatus 100 projects the infrared laser light only to the UI region 502.

[Distance Calculation Method]

Figure 6A:
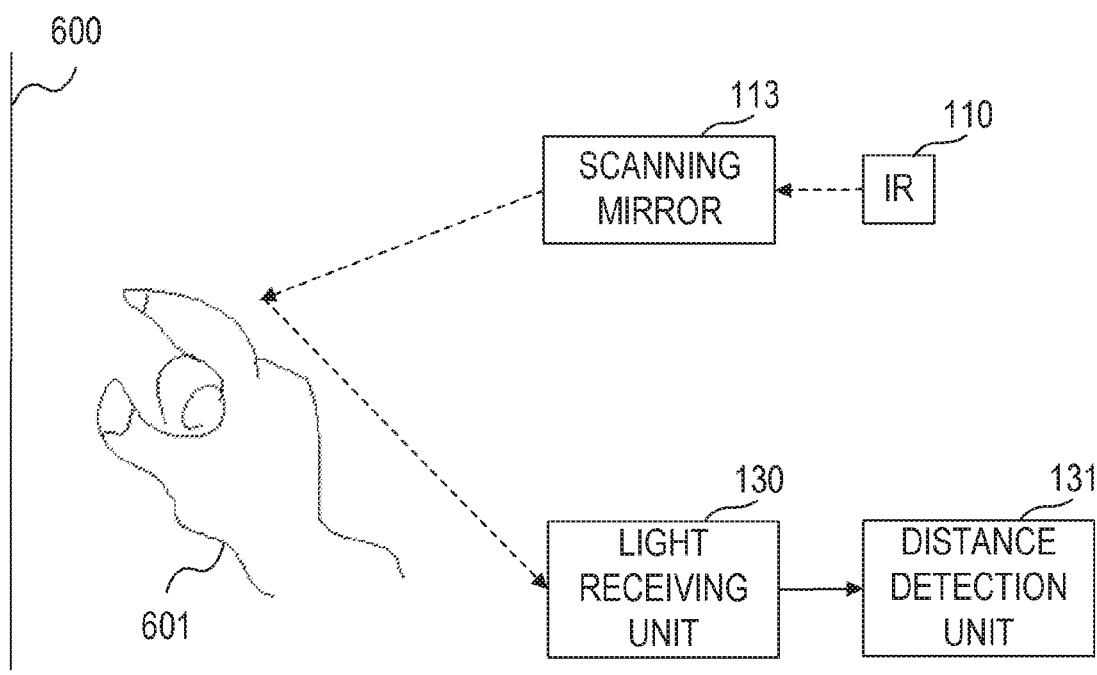
FIG. 6A and FIG. 6B are diagrams depicting a distance calculation method using invisible light.
Figure 6B:
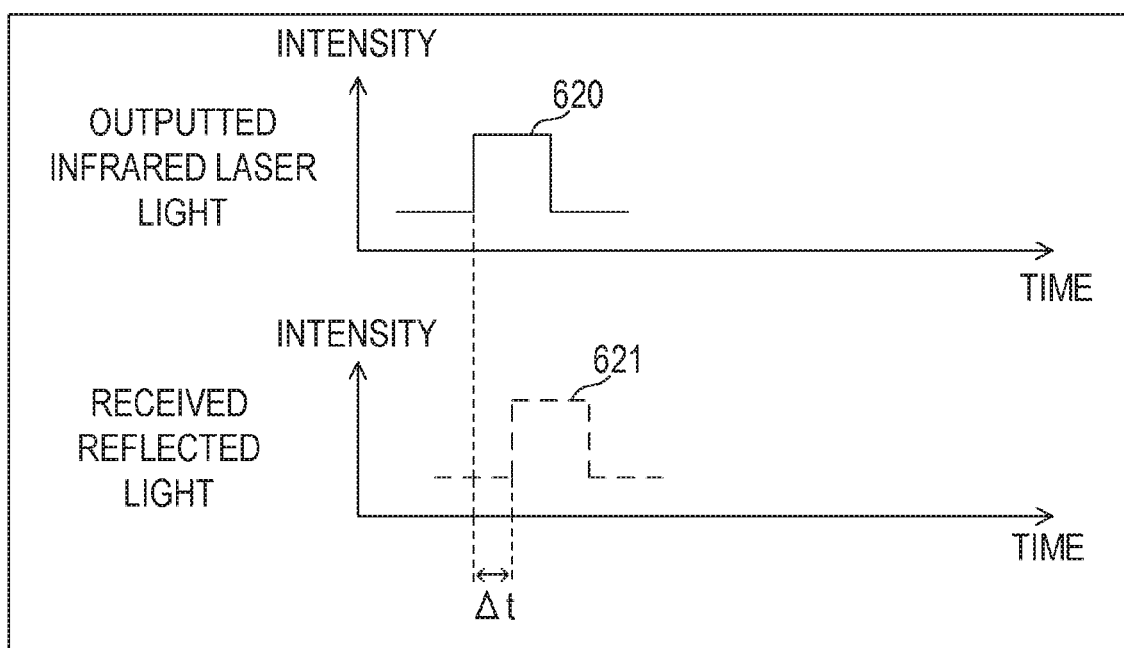

FIG. 6A and FIG. 6B indicate a distance calculation method using the infrared laser light according to the first embodiment.

FIG. 6A is a diagram depicting detection of the reflected light corresponding to the projected infrared laser light. The infrared laser light outputted from the infrared laser light source 110 is projected to a projection surface 600 via the scanning mirror 113. Then the infrared laser light, reflected by the projection surface 600 or an obstacle 601 (e.g. hand of the user), is detected by the light receiving unit 130.

FIG. 6B indicates the infrared laser light outputted from the infrared laser light source 110 and the reflected light received by the light receiving unit 130. A waveform 620 is a waveform that indicates a lighting timing of the infrared laser light outputted from the infrared laser light source 110, where the abscissa indicates the time, and the ordinate indicates the intensity of the infrared light. A waveform 621 is a waveform that indicates a light receiving timing of the infrared light, which is received by the light receiving unit 130, where the abscissa indicates the time, and the ordinate indicates the intensity. At indicates time until the laser light, emitted from the infrared laser light source 110, is reflected by the projection surface or an obstacle, and is returned.

The distance detection unit 131 calculates the distance between the projection apparatus 100 and the projection surface 600 or the obstacle 601 using the following Expression (1), based on the rise time difference between the waveform 620 and the waveform 621 (phase difference between the emitted light and the reflected light).
(Math. 1)

$$d = c \times \Delta t / 2 \quad (1)$$

Here d is distance and c is speed of light. The above mentioned time difference may be regarded as a time difference from the irradiation of invisible light to detection of the reflected light thereof.

The distance detection unit 131 generates a distance image having the same number of pixels as the infrared projection region information after the distance measurement is repeated for a number of pixels of the projection image.

[Generation of UI Operation Information]

FIG. 7A to FIG. 7D are conceptual diagrams for describing the generation of the UI operation information according to this embodiment.

FIG. 7A is a diagram of a reference distance image 700, which indicates a distance between the projection apparatus 100 and the projection surface 600 (hereafter called "reference distance"). The reference distance image 700 is a distance image that is acquired by the distance detection unit 131 in a state where no obstacle exists between the projection apparatus 100 and the projection surface 600. Each pixel value in the reference distance image 700 is a value that indicates the distance between the projection apparatus 100 and the projection surface 600. In this embodiment, the distance is detected only for the region where the UI image is displayed (FIG. 4B), hence a value that indicates the distance ("10" in the case of FIG. 7A) is acquired only for corresponding pixels. The target pixels for which the reference distance is acquired are not especially limited, and distance may be measured for all the pixels.

Figure 7B:
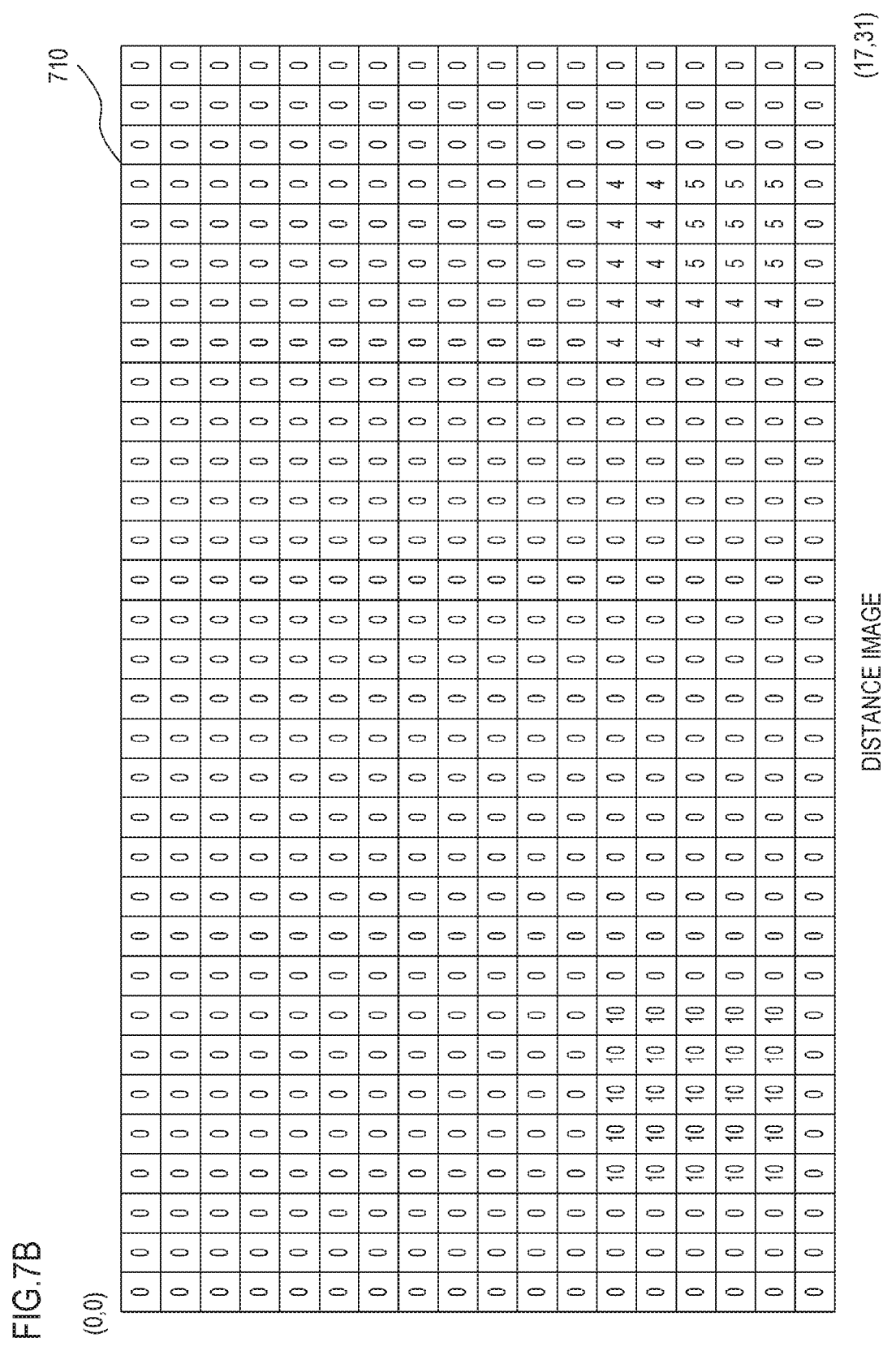

FIG. 7B is a diagram of a distance image 710, which indicates a distance between the projection apparatus 100 and the projection surface 600 or the obstacle 601. The distance image 710 is a distance image that is acquired by the distance detection unit 131 in a state where an obstacle exists between the projection apparatus 100 and the projection surface 600. In the first embodiment, the distance detection unit 131 measures distance for pixels included in the region where the UI image is displayed. For pixels that are not the target of distance measurement, the distance image 710 is generated using the values of the reference distance image 700. The target pixels of the distance measurement are not especially limited, and distance may be measured for all the pixels.

Figure 7C:
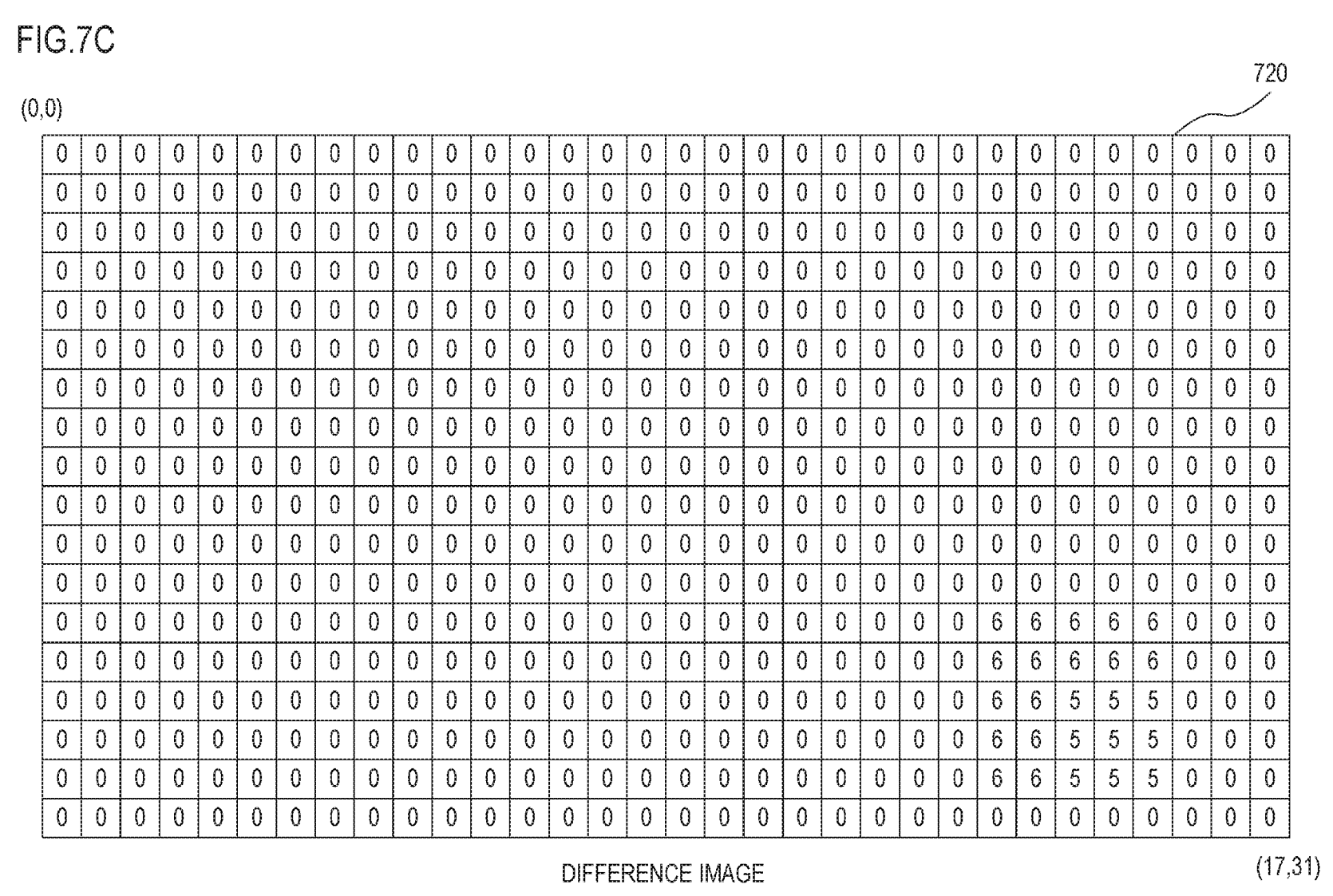

FIG. 7C is a diagram of a difference image 720, which is acquired by comparing each pixel value between the reference distance image 700 and the distance image 710.

Figure 7D:
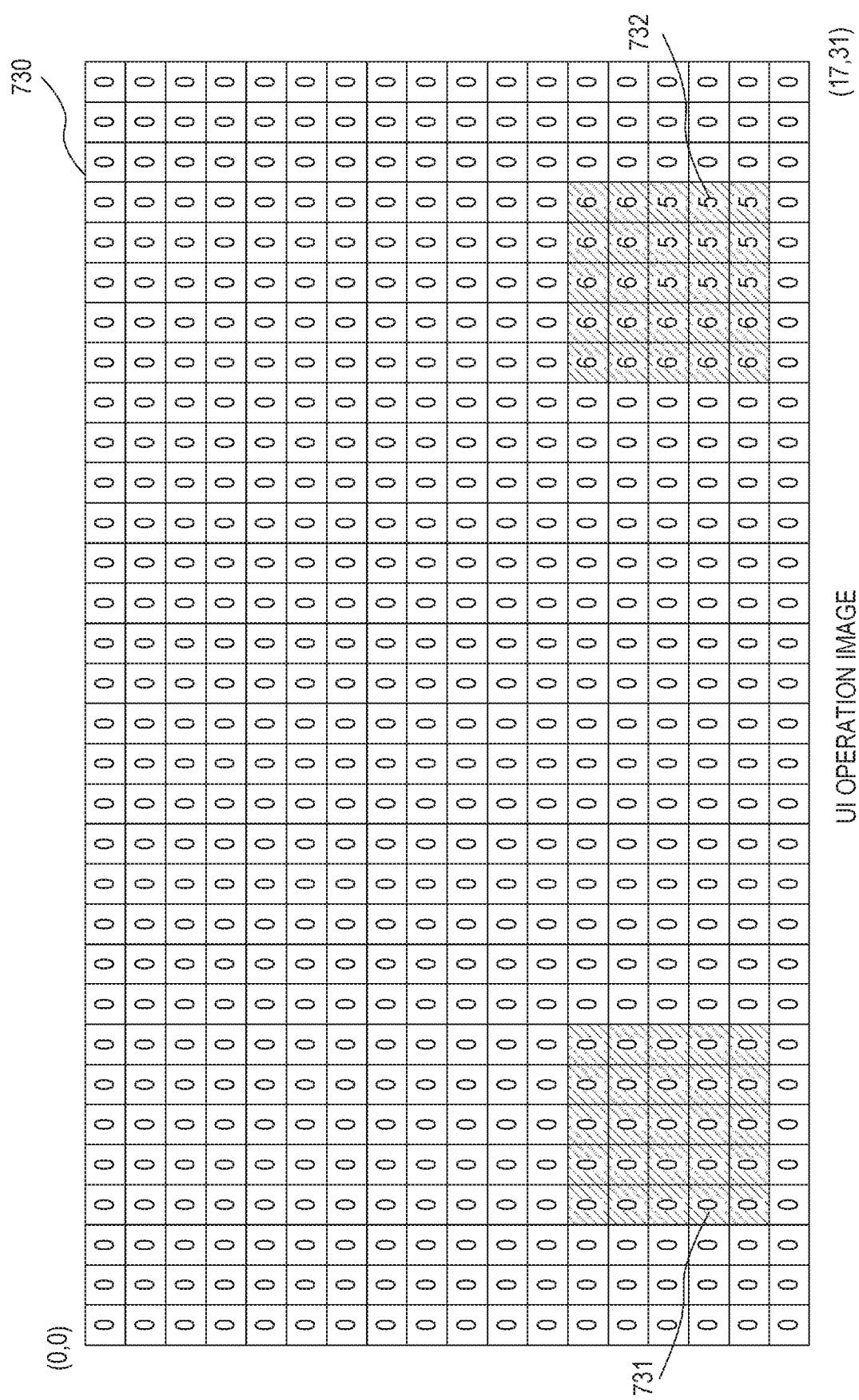
FIG. 7D is a conceptual diagram depicting a UI operation image.

FIG. 7D is a diagram of a UI operation image 730, which is acquired by calculating a product of the difference image 720 and the above mentioned infrared projection region information 450 for each pixel. The CPU 101 analyzes the UI region 731 and the UI region 732, and detects the user operation for the UI 401 and the UI 402. For example, the CPU 101 can detect a user operation for the UI by comparing the average of the pixel values in the UI region 731 or the UI region 732 with a predetermined value. The predetermined value here is a value to determine whether the difference between the distance acquired by the distance detection unit 131 and the reference distance is caused by the user operation, and may be 2, for example. In this case, the average value of the pixel values in the UI region 732 in FIG. 7D is 5.64, which means that the average value in the UI region 732 is larger than the predetermined value, therefore the CPU 101 determines that the user operation for the UI 402 was performed. The CPU 101 operates the application using the UI operation determination result. The average value in the UI region 731, on the other hand, is 0, hence the CPU 101 determines that the user operation for the UI 401 was not performed. The predetermined value is not especially limited. The CPU 101 may determine that the user operation was performed if the pixel values in the UI operation image 730 are not 0, without using the predetermined value.

As described above, when the user operation for the UI image included in the projection image is detected, only the UI image is irradiated with the infrared laser light, whereby the unnecessary projection of the infrared laser light can be suppressed, and power consumption of the projection apparatus 100 can be conserved.

Second Embodiment

In the above mentioned the first embodiment, an example of generating a projection image inside the projection apparatus was described. The projection apparatus according to a second embodiment, however, detects a user operation for an UI image included in a screen displayed by the application, which is executed on an external apparatus. In the configuration of a projection apparatus 200 according to the second embodiment, a functional unit the same as the first embodiment is denoted with the same reference numbers, and description thereof is omitted.

Figure 8:
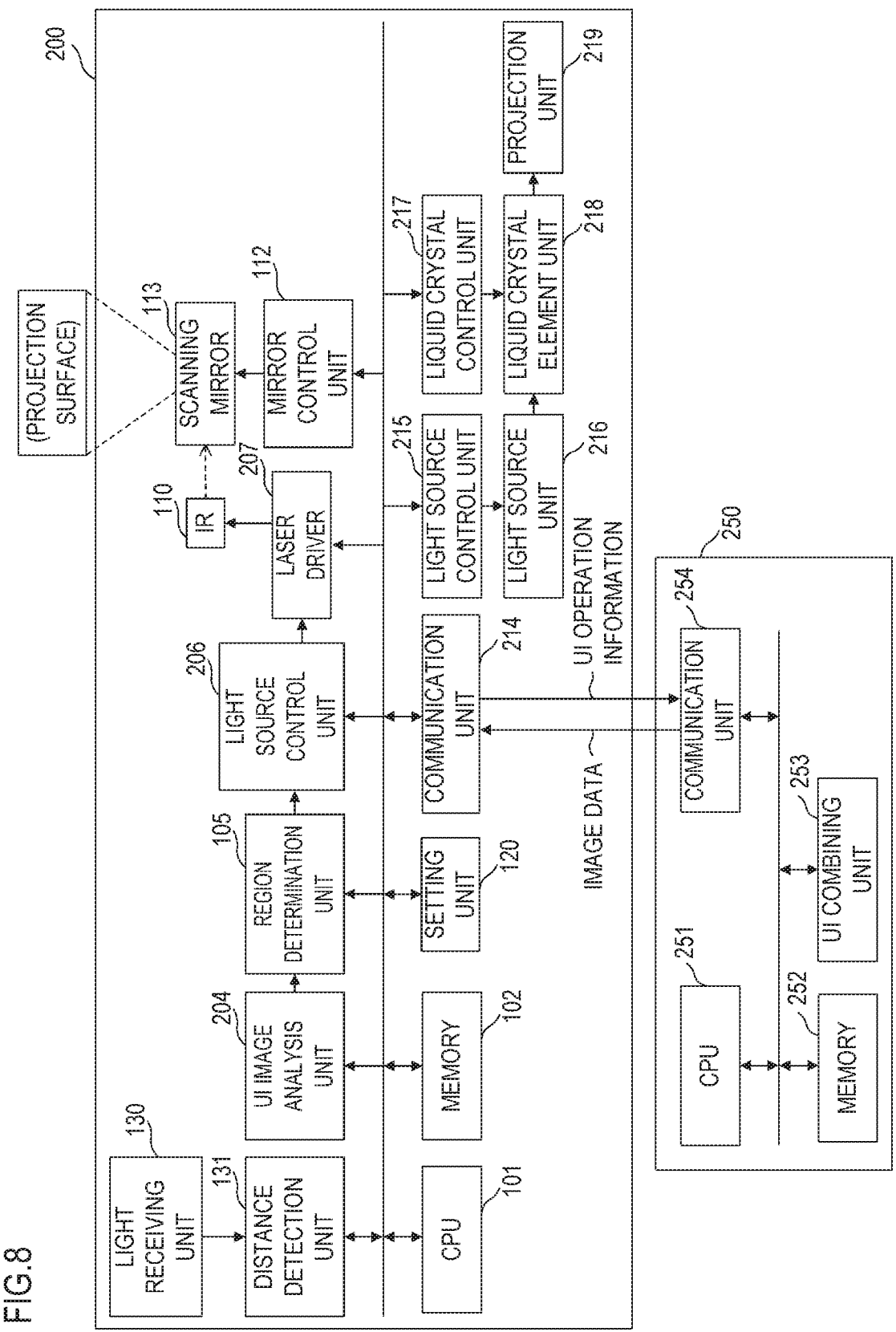
FIG. 8 is a block diagram depicting an example of a projection apparatus and an external apparatus.

FIG. 8 is a block diagram depicting configurations of the projection apparatus 200 and an external apparatus 250 according to the second embodiment.

[Projection Apparatus 200]

The projection apparatus 200 projects a projection image, which is outputted from the external apparatus 250, using a liquid crystal panel. The projection apparatus 200 also projects infrared laser light by two-dimensional scanning using the scanning mirror 113.

A UI image analysis unit 204 is a functional unit that analyzes whether a UI is included in the projection image inputted from the external apparatus 250. If the UI is included in the projection image, the UI image analysis unit 204 acquires information to specify the position of the UI image in the projection image data.

A light source control unit 206 is a functional unit that generates a light source control signal for controlling the infrared laser light source IR based on the infrared projection region information. In the second embodiment, the invisible light is projected by the laser scanning system, but the image projection method is not especially limited, and may be an image projection using a liquid crystal panel, for example.

A laser driver 207 is a functional unit that modulates the driving current of the infrared laser light source 110 based on the light source control signal outputted by the light source control unit 206, and outputs the modulated driving current to the infrared laser light source 110.

A communication unit 214 is a functional unit that performs communication between the projection apparatus 200 and the external apparatus 250. In the second embodiment, a communication unit 214 receives the projection image data from the external apparatus 250 (input). The communication unit 214 also transmits the UI operation information detected by the projection apparatus 200 to the external apparatus 250 (output).

A light source control unit 215 is a functional unit that controls ON/OFF and brightness of the light source unit 216, which will be described later. The light source control unit 215 is a microprocessor for control, for example. The light source control unit 215 need not be a dedicated microprocessor, and, for example, the CPU 101 may execute the same processing as the light source control unit 215.

A light source unit 216 is a functional unit that outputs light to project an image, and is constituted by a laser, an LED halogen lamp, a xenon lamp or a high pressure mercury lamp, for example.

A liquid crystal control unit 217 controls the voltage to be applied to the liquid crystals of each pixel (R pixel, G pixel, B pixel) of a later mentioned liquid crystal element unit 218 based on the inputted projection image data, so as to adjust the reflectance or transmittance of the liquid crystal element.

A liquid crystal element unit 218 is a functional unit that modules the light of red (R), green (G) and blue (B) by applying voltage to each liquid crystal element, on which a filter of red (R), green (G) or blue (B) is disposed, in accordance with the pixel value of the projection image.

A projection unit 219 is a functional unit that combines the light of red (R), green (G) or blue (B) transmitted through the liquid crystal element unit 218. For example, the projection unit 219 is a dichroic mirror, a prisms or the like. The light generated by combining the components of red (R), green (G) or blue (B) is sent to a projection optical system (not illustrated). At this time, the liquid crystal element unit 218 is controlled by liquid crystal control unit 217, so as to have transmittance of the light corresponding to the inputted projection image data. Therefore when the light combined by the projection unit 219 is projected by the projection optical system, an image corresponding to the inputted projection image is displayed on the projection surface. In the second embodiment, the image is projected using the liquid crystal panel, but the image projection method is not especially limited, and, for example, the image may be projected by the laser scanning method, just like the first embodiment.

[External Apparatus 250]

The external apparatus 250 is information processing apparatus (computer) which includes an arithmetic unit (processor), a memory, a storage device, an input/output device and the like. The later mentioned functions of the external apparatus 250 are provided by the external apparatus 250 executing the programs stored in the storage device. A part or all of these functions may be implemented by a dedicated logic circuit, such as an ASIC and FPGA. Specifically, the external apparatus 250 is a computer, a smartphone, a digital camera or the like. The external apparatus 250 transmits (outputs) image data to be projected to the projection apparatus 200. Instead of the external apparatus 250, the projection apparatus 200 may be connected with a data base on a network (not illustrated), so as to acquire the image from the data base on the network.

A CPU 251 executes programs stored in a later mentioned memory 252, so as to control operation of each function of the external apparatus 250. The CPU 251 also executes applications in the external apparatus 250 stored in the memory 252.

The memory 252 stores program codes executed by the CPU 251, image data and the like.

A UI combining unit 253 is a functional unit that outputs an image, which is acquired by combining the UI image with the image generated by the CPU 251, to a communication unit 254.

The communication unit 254 outputs the projection image data to the projection apparatus 200. The CPU 251 executes applications by receiving the UI operation information from the projection apparatus 200 via the communication unit 254.

Figure 9:
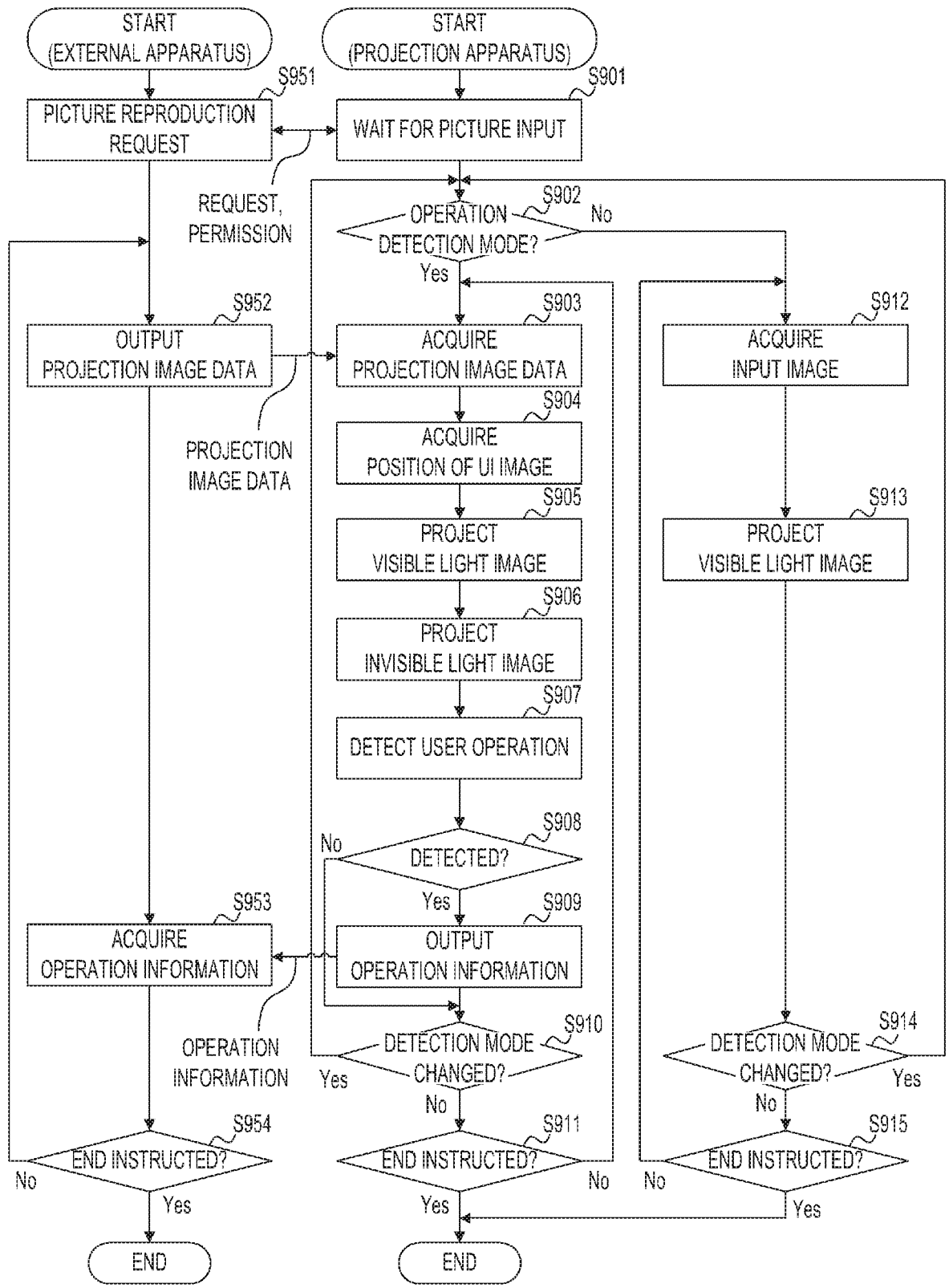
FIG. 9 is a flow chart depicting an example of image projection processing.

FIG. 9 is a flow chart depicting processing of the projection apparatus 200 and the external apparatus 250 according to the second embodiment. The operation of the external apparatus 250 will be described first.

[External Apparatus 250]

In S951, the CPU 251 requests connection of the external apparatus 250 and the projection apparatus 200 to the projection apparatus 200, and establishes the connection. After the external apparatus 250 receives permission to project an image to the projection apparatus 200, processing advances to S952.

In S952, the CPU 251 outputs the projection image data to the projection apparatus 200 via the communication unit 254.

In S953, the CPU 251 receives operation information on the UI image superimposed on the projection image. For example, the CPU 251 periodically checks the interruption of the communication unit 254, or the state of the communication unit 254, and receives operation information on the UI image.

In S954, the CPU 251 determines whether the projection of the image is continued. Processing returns to S952 if the projection of the image is continued, or processing ends if not. The operation of the projection apparatus 200 will be described next.

[Projection Apparatus 200]

In S901, the CPU 101 waits for a connection request from the external apparatus 250. When the connection request is received, the CPU 101 sends a connection permission to the external apparatus 250, and processing advances to step S902. Description on the processing in S902, which is the same as the above mentioned S201, is omitted.

In S903, the CPU 101 acquires the projection image data from the external apparatus 250.

In S904, the CPU 101 analyzes the projection image data, and acquires information on the position where the UI image is displayed in the projection image. In the second embodiment, the CPU 101 analyzes the projection image data using the UI image analysis unit 204, so as to detect the position, size and so on of the UI image in the projection image data. For example, the UI image analysis unit 204 detects a rectangular portion in which gradation does not change very much, and detects a portion including text as the UI image. The UI image analysis unit 204 may acquire the position and other information of the UI image using an artificial intelligence algorithm of a deep learning method, for example. In concrete terms, the UI image analysis unit 204 may acquire (detect) a portion corresponding to the UI image in the projection image using an identifier which is acquired by learning the UI image in advance. The CPU 101 outputs the position, size and the like of the UI image acquired by the UI image analysis unit 204 to the region determination unit 105. Description on the processing in S905 to S908, which are the same as S204 to S207, is omitted.

In S909, responding to the reception of the user operation detection signal, the CPU 101 outputs an operation signal, to execute the corresponding processing, to the external apparatus 250. For example, the CPU 101 may output an operation signal for the UI image (e.g. a button) to instruct page forward/return to the external apparatus 250. Description on the processing in S910 to S911, which are the same as S209 to S210, is omitted.

In S912, the CPU 101 acquires the projection image data from the external apparatus 250. Description of the processing in S913 to S915, which are the same as S212 to S214, is omitted.

As describe above, for the UI operation of an application that is executed on the external apparatus which is connected via the projection apparatus as well, the projection of infrared laser light that is unnecessary for the UI operation can be suppressed without sacrificing the operability of the UI, whereby power consumption of the projection apparatus can be conserved.

Third Embodiment

In the above mentioned second embodiment, an example of the projection apparatus acquiring the projection image data from the external apparatus, and acquiring a position and other information of the UI image in the projection apparatus, was described. In the projection apparatus according to a third embodiment, however, the projection image data and the position and other information on the UI image are acquired from an external apparatus. In the configuration of the projection apparatus 300 according to the third embodiment, a functional unit the same as the first or second embodiment is denoted with the same reference numbers, and description thereof is omitted.

Figure 10:
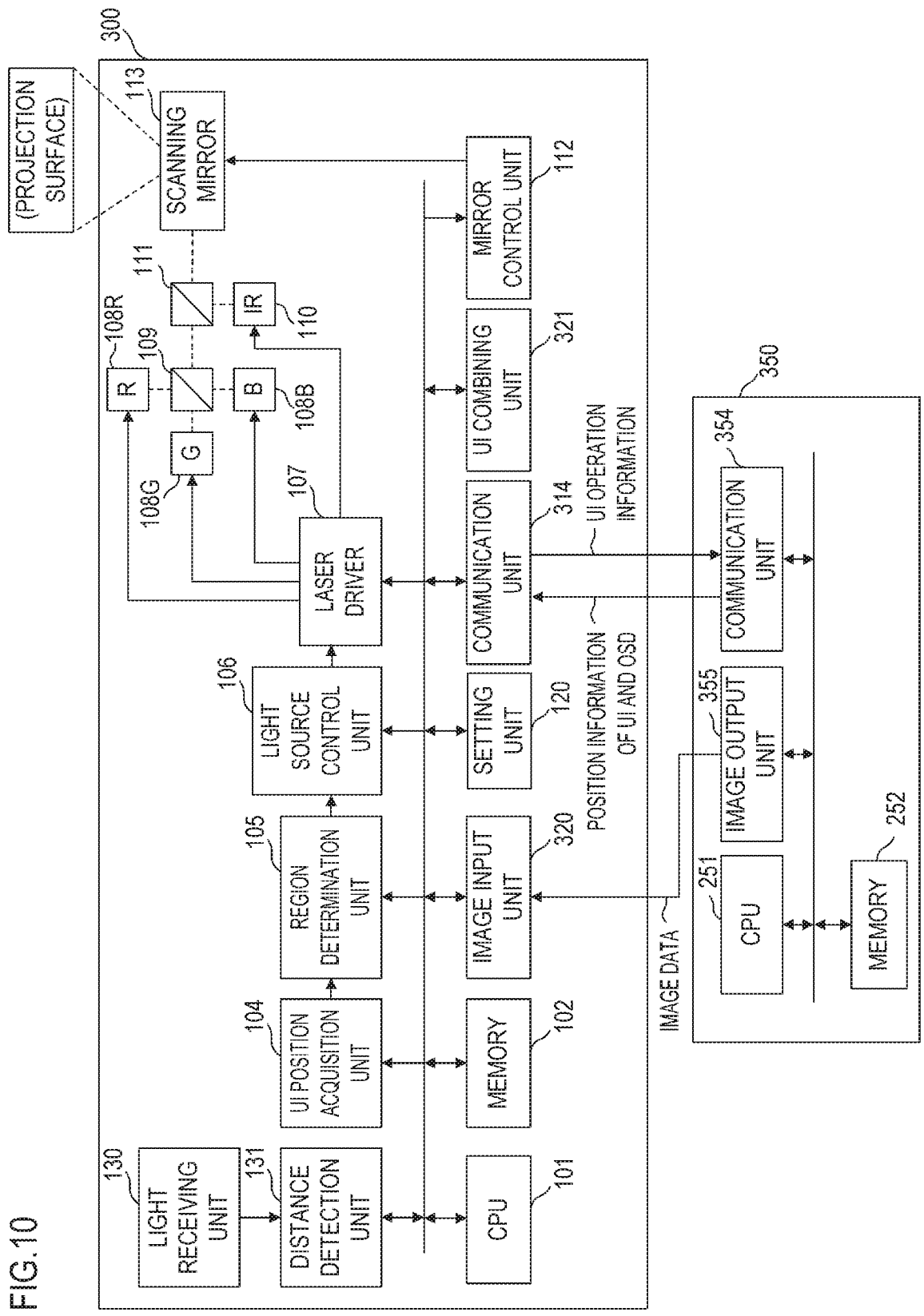
FIG. 10 is a block diagram depicting an example of a projection apparatus and an external apparatus.

FIG. 10 is a block diagram depicting configurations of the projection apparatus 300 and the external apparatus 350 according to the third embodiment.

[Projection Apparatus 300]

An image input unit 320 is a functional unit that inputs projection image data from the external apparatus 350.

A communication unit 314 is a functional unit that inputs UI image data to be combined with the projection image data and position information of the UI image from the external apparatus 350.

A UI combining unit 321 is a functional unit that combines the UI image data with the projection image data. The combined image data can be stored in the memory 102.

[External Apparatus 350]

An image output unit 355 is a functional unit that outputs projection image data to the projection apparatus 300.

A communication unit 354 is a functional unit that outputs the UI image data and position information of the UI image to the projection apparatus 300. The communication unit 354 also acquires UI operation information from the projection apparatus 300. The CPU 251 operates an application that is executed using the acquired UI operation information.

As described above, for the UI operation of an application that is executed on the external apparatus which is connected with the projection apparatus as well, the projection of infrared laser light that is unnecessary for the UI operation can be suppressed without sacrificing operability of the UI, whereby power consumption of the projection apparatus can be conserved.

Fourth Embodiment

In the above mentioned first embodiment, an example of conserving power consumption of the projection apparatus by projecting the infrared laser light to the UI image of the projection image was described. In a fourth embodiment, an example of the projection apparatus that has two modes when the infrared laser light is projected will be described. In the fourth embodiment, the infrared laser light is projected to the UI image in the same manner as the embodiments described above if the user exists near the projection image (first projection mode), and the infrared laser light is projected to the outer frame of the projection image if the user does not exist (second projection mode). An example when invisible light is projected to the upper lower left and right edge regions in the projection image, as the outer frame of the projection image, will be described here. In the configuration of the projection apparatus 400 according to the fourth embodiment, a functional unit the same as the first embodiment is denoted with the same reference numbers, and description thereof is omitted.

Figure 11:
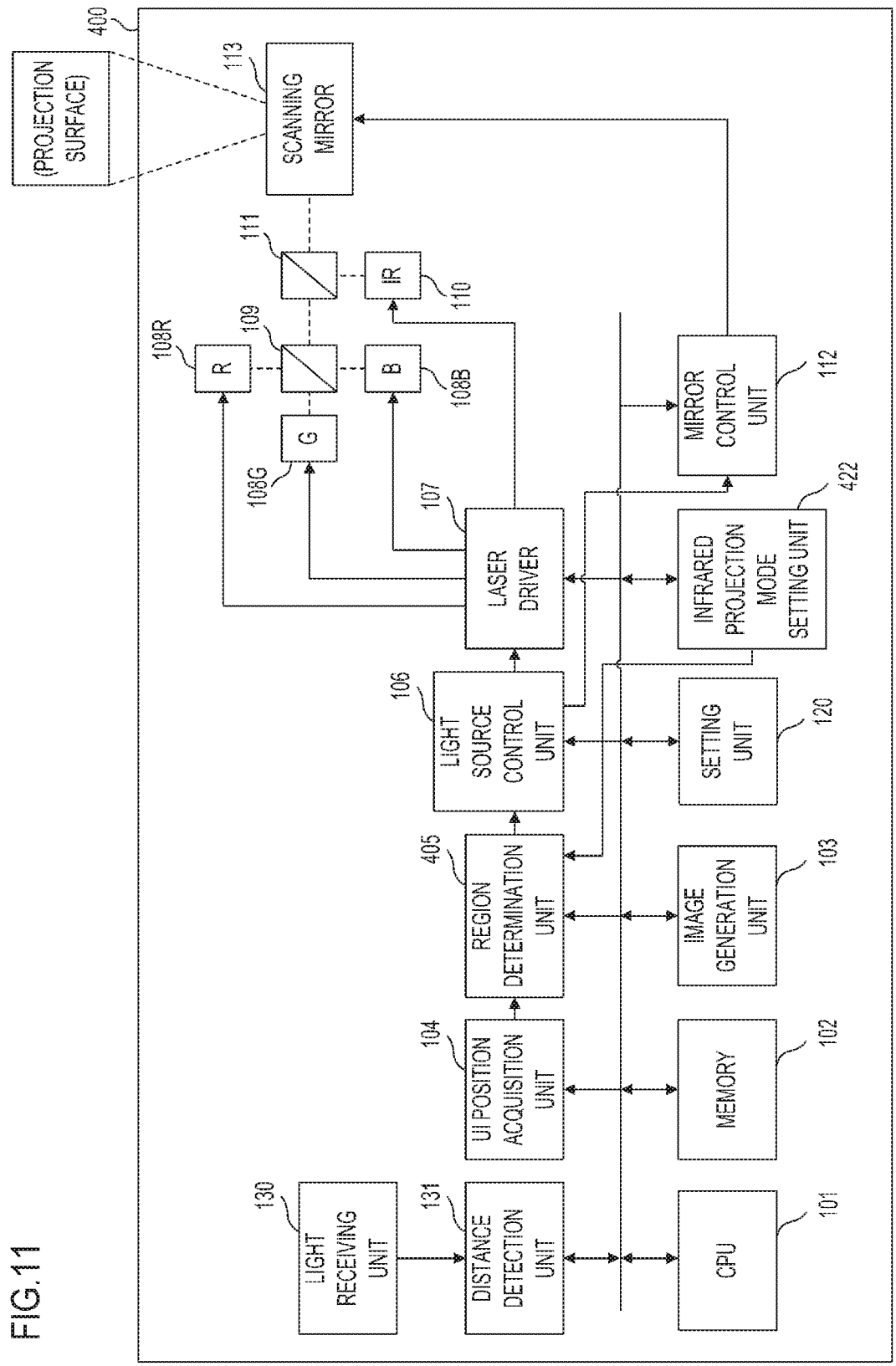
FIG. 11 is a block diagram depicting an example of a projection apparatus.

FIG. 11 is a block diagram depicting a configuration of a projection apparatus 400 according to the fourth embodiment.

An infrared projection mode setting unit 422 is a functional unit that determines whether a user exists near the projection surface, and sets a projection mode of the infrared laser light depending on the determination result. The determination whether the user exists or not will be described later. If the user exists near the projection surface, the infrared projection mode setting unit 422 sets the first projection mode, which is a mode of projecting the infrared laser light to the UI portion. If the user does not exist near the projection surface, the infrared projection mode setting unit 422 sets the second projection mode, which is a mode of projecting the infrared laser light to the outer frame of the projection image.

A region determination unit 405 is a functional unit that determines a region to which the infrared laser light is projected (infrared projection region). Here the region determination unit 405 acquires the projection mode setting information from the infrared projection mode setting unit 422. Then in the case of the first projection mode, the region determination unit 405 determines the infrared projection region, so that the infrared laser light is projected to the portion corresponding to the UI region. In the case of the second projection mode, the region determination unit 405 determines the infrared projection region, so that the infrared laser light is projected to the outer frame of the projection surface. The region determination unit 405 acquires information to specify the position of the UI image in the projection image data (UI position information) from the UI position acquisition unit 104.

Figure 12:
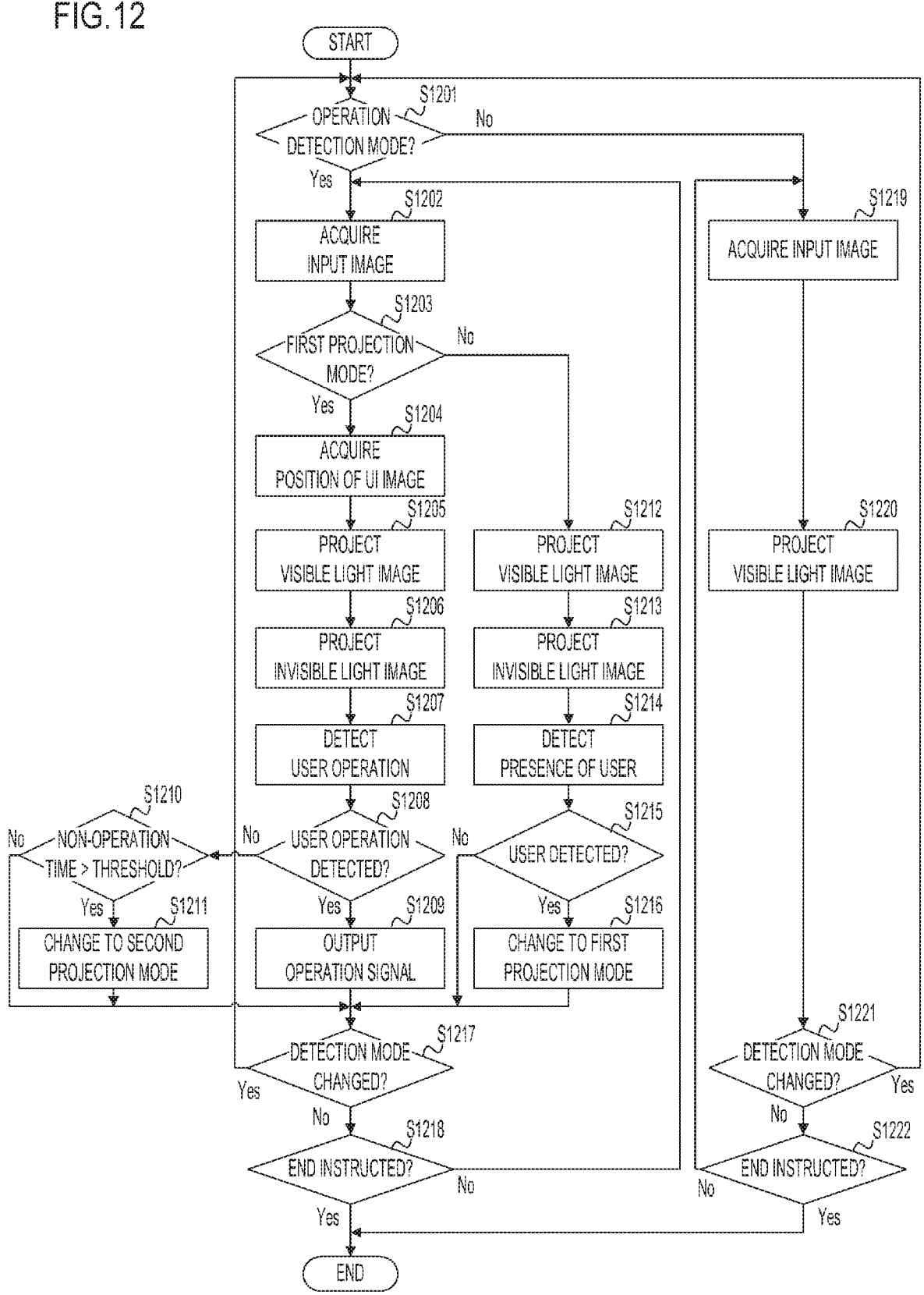
FIG. 12 is a flow chart depicting an example of image projection processing.

FIG. 12 is a flow chart depicting the projection processing according to the fourth embodiment. The projection apparatus 100 according to the fourth embodiment radiates invisible light along the outer frame of the projection image (second projection mode) in the case where the operation detection mode is enable and the user operation (including intrusion of a hand, pointer or the like) did not occur. The invisible light in the second projection mode may be regarded as an image to detect the approach of the user to the projection screen. In the case where the hand of the user, a pointer or the like does not intrude in the invisible light projected along the outer frame of the projection image, the processing to radiate the invisible light to the region corresponding to the UI image is performed in the same manner as the first embodiment (first projection mode).

The description on the processing in S1201 to S1202, which are the same as S201 to S202, is omitted.

In S1203, the CPU 101 determines whether the projection mode is the first projection mode. In the fourth embodiment, the case where the projection mode is not the first projection mode is the case when the projection mode is the second projection mode. Processing advances to S1204 if the projection mode is the first projection mode, or to S1212 if not. In the fourth embodiment, the two projection modes can be set, but three or more projection modes may be provided. An operation flag, which is a flag (0 or 1) to indicate whether the generation of the user operation is predicted in a state, may be used. The case where the operation flag is 0 is, for example, a case where the user or a pointer does not intrude in the projection region, and this state continues longer than a predetermined period (threshold) (corresponds to the above mentioned second mode). The case where the operation flag is 1 is a case where the user or a pointer intrudes in the projection region. This includes a case where a time elapsed after the intrusion of the user or the pointer is cleared is a predetermined period or less. The description of the processing in S1204 to S1209, which are the same as S203 to S208, is omitted.

In S1210, the CPU 101 determines whether the time when a user operation is not performed is longer than a predetermined time (threshold). In concrete terms, when the CPU 101 does not detect a user operation for at least a predetermined time, the CPU 101 determines that the user does not exist, and processing advances to S1217. If the CPU 101 determines that the user exists, processing advances to S1211.

In S1211, the CPU 101 sets the projection mode to the second projection mode. The CPU 101 may change the projection mode to the second mode when the user or pointer does not exist between the projection apparatus 400 and the projection surface. According to the fourth embodiment, in S1207 to S1211, the projection mode is changed when the user operation is not performed for a predetermined period after a user operation is detected, but the projection mode may be changed when the user or pointer does not exist as the result of detection processing. In this case as well, the projection mode may be changed when the user or pointer does not exist for a predetermined period. The description of the processing in S1212, which is the same as S204, is omitted.

In S1213, the CPU 101 projects invisible light in the second projection mode. In the fourth embodiment, the CPU 101 projects the invisible light along the outer periphery of the projection region. The invisible light may be projected to a region other than the outer periphery of the projection region, such as the left and right edge regions of the projection region respectively. The shape of the invisible light in the second projection mode is not limited as long as intrusion of the user or the like into the projection region can be detected. The invisible light may be projected after each predetermined time interval, instead of being projected constantly.

In S1214, the CPU 101 detects whether the user exists in the projection region. In concrete terms, the presence of the user is detected by receiving the reflected light of the invisible light projected in S1213. The CPU 101 may detect the user operation in the same manner as S1207.

In S1215, the CPU 101 determines whether the user exists in the projection region based on the detection result in S1214. Processing advances to S1216 if it is determined that the user exists, or to S1217 if not.

In S1216, the CPU 101 sets the projection mode of the infrared laser light to the first projection mode. The description of the processing in S1217 to S1222, which are the same as S209 to S214, is omitted.

In the fourth embodiment, by executing the above processing, the invisible light is projected to the outer frame and output of the invisible light is suppressed if the user does not exist in the projection region, whereby power consumption can be conserved.

Figure 13A:
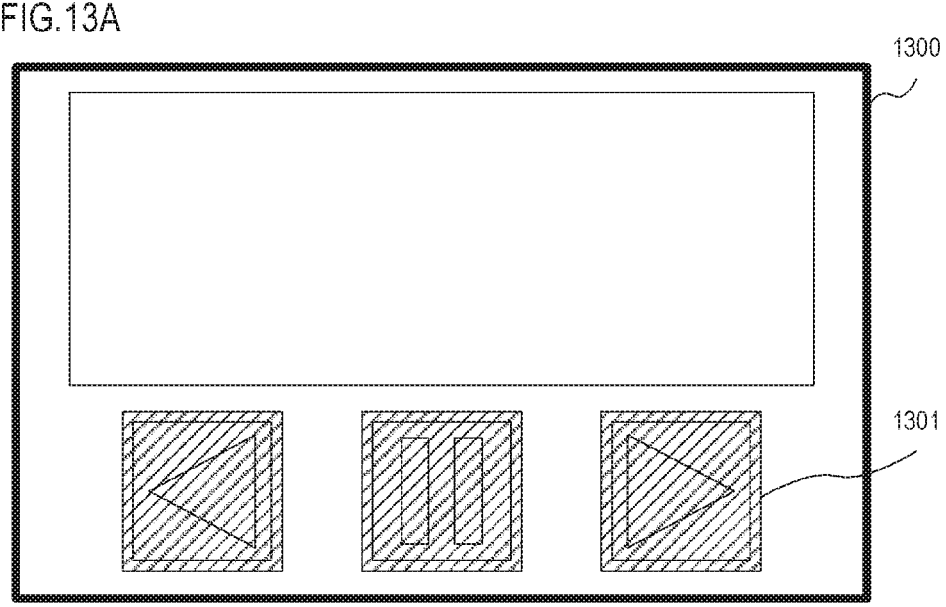
FIG. 13A and FIG. 13B are diagrams depicting an example of an invisible light projection region.
Figure 13B:
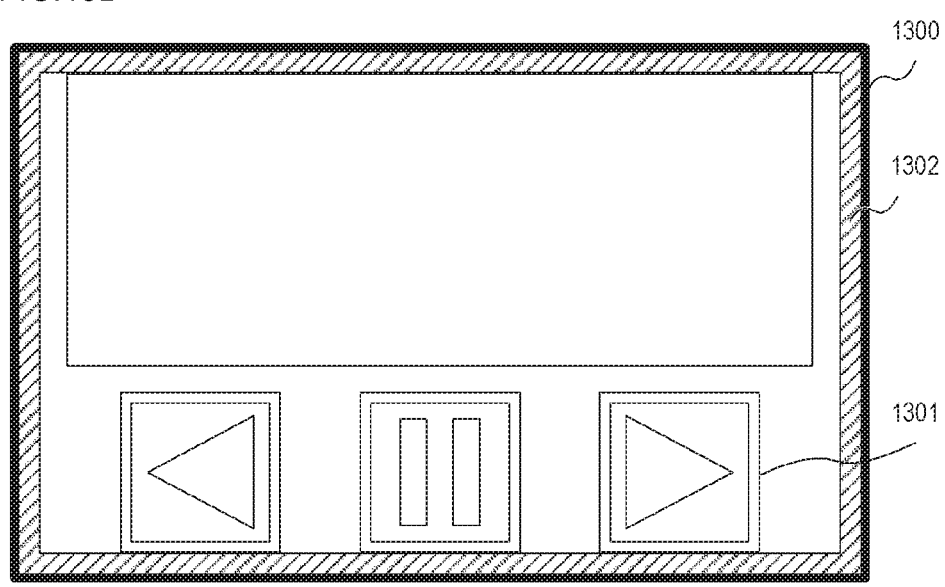

FIG. 13A and FIG. 13B indicate the projection shapes of the infrared laser light according to the fourth embodiment. FIG. 13A is a conceptual diagram in the case where the infrared laser light is projected in the first projection mode. A projection image 1300 is an image projected by the projection apparatus 400. In the example in FIG. 13A, a UI 1301, which is a UI image for the user to perform operation of the projection image, is included in a part of the projection image 1300. If the projection mode is the first projection mode, the projection apparatus 400 projects the infrared laser light to the UI 1301 portion so as to detect the UI operation performed by the user.

FIG. 13B is a conceptual diagram in the case where the infrared laser light is projected in the second projection mode. A region 1302 indicates a projection shape of the infrared laser light projected by the projection apparatus 400. The projection apparatus 400 projects the infrared laser light limited to the region 1302 of the projection image, so as to conserve power consumption during standby time of the user operation. When the infrared laser light is projected to the region 1302, the projection may be performed with skipping pixels so as to conserve power consumption. In the above processing, the invisible light is periodically projected since it is possible that the shape of the projection surface may change, but the invisible light may be projected only once at the beginning of the processing. Further, only the invisible light may be projected when the visible light is not projected. In the fourth embodiment, an example of projecting the invisible light to the upper, lower, left and right edge regions in the projection image, as, the outer frame of the projection image, was described, but the outer frame may be any region that can indicate the region to which the invisible light is projected to detect the presence of the user. For example, as the outer frame, the invisible light may be projected to the peripheral area of the UI image.

Fifth Embodiment

In the above mentioned the fourth embodiment, an example of projecting the invisible light to the upper, lower, left and right edge regions in the projection image in the second projection mode was described. In a fifth embodiment, an example of projecting the infrared laser light to the outer side of the projection image, that is, the outer frame of the projection image in the second projection mode, will be described. The description of the configuration of the projection apparatus 400, which is the same as the fourth embodiment, is omitted.

FIG. 14 is a conceptual diagram of the projection image and the infrared laser light according to the fifth embodiment. The projection apparatus 400 according to the fifth embodiment projects a region 1402 of the infrared laser light to the outer side of the projection image 1300. This is because the presence of the user is detected at the outer side of the projection image, so that the switching operation from the second projection mode to the first projection mode is completed within the time before the user performs the UI operation.

The region 1402 may be projected using a portion of scanning lines in the scanning mirror 113, which is not used for effective pixels. For example, the scanning mirror 113 includes portions where the pixel density is uneven on the left and righty edges of the projection region, hence the region 1402 may be projected to the outer side of the image projection surface using these left and right edges of the projection region of the scanning mirror 113.

Sixth Embodiment

In the first to fifth embodiments, a projection apparatus which scans the infrared laser light and the visible laser light (RGB) on the projection surface respectively was described. In a sixth embodiment, however, an apparatus that projects infrared laser light (predetermined light) to an object on the projection surface (operation object) and detects the user operation performed for the object will be described.

Figure 15:
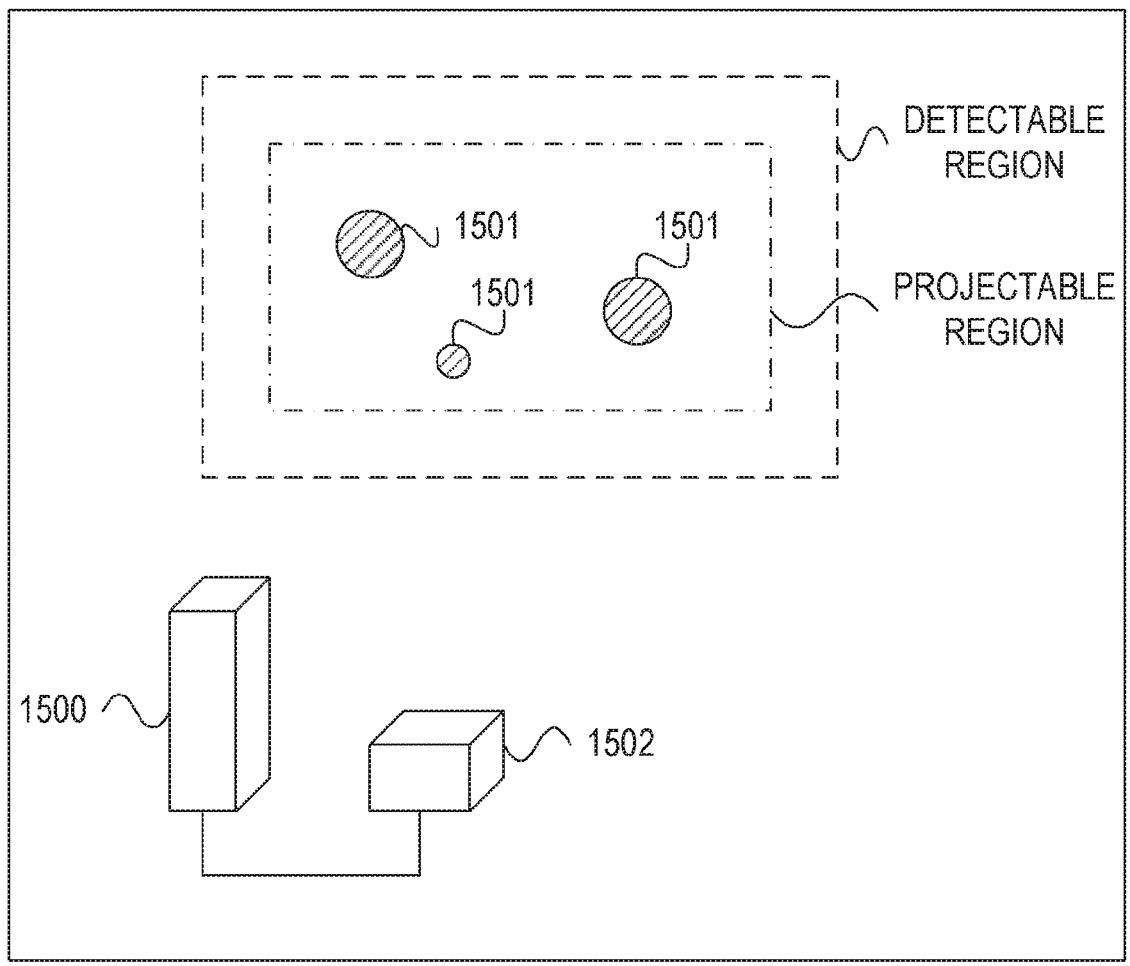
FIG. 15 is a schematic diagram depicting a detection apparatus.

FIG. 15 is a schematic diagram depicting a detection apparatus 1500 which radiates infrared light on an object and detects the operation that the user performed for the object. The detection apparatus 1500 radiates infrared laser light toward an object (button) 1501 disposed on a wall surface, and detects the user operation for the object 1501 by detecting the reflected wave of the infrared laser light. The detailed description on the detection method, which is the same as the method described in the first embodiment, is omitted.

Responding to the detection of the user operation for the object 1501, the detection apparatus 1500 sends information that indicates the detection result to a projector 1502. The projector 1502 executes the processing in accordance with the information that indicates the received detection result. For example, the projector 1502 projects an image, which indicates attached information, to the object 1501 for which the user operation was detected. The projector 1502 also changes an image that has been projected in advance to the object 1501, for which the user operation was detected, when the user operation is detected.

The detection system illustrated in FIG. 15 is an example, and the present invention is not limited to this example. The apparatus that outputs the detection result is not limited to the projector, but may be a management server, a personal computer, a tablet or a smartphone. The region irradiated with the infrared light is not limited to the wall surface illustrated in FIG. 15.

Figure 16:
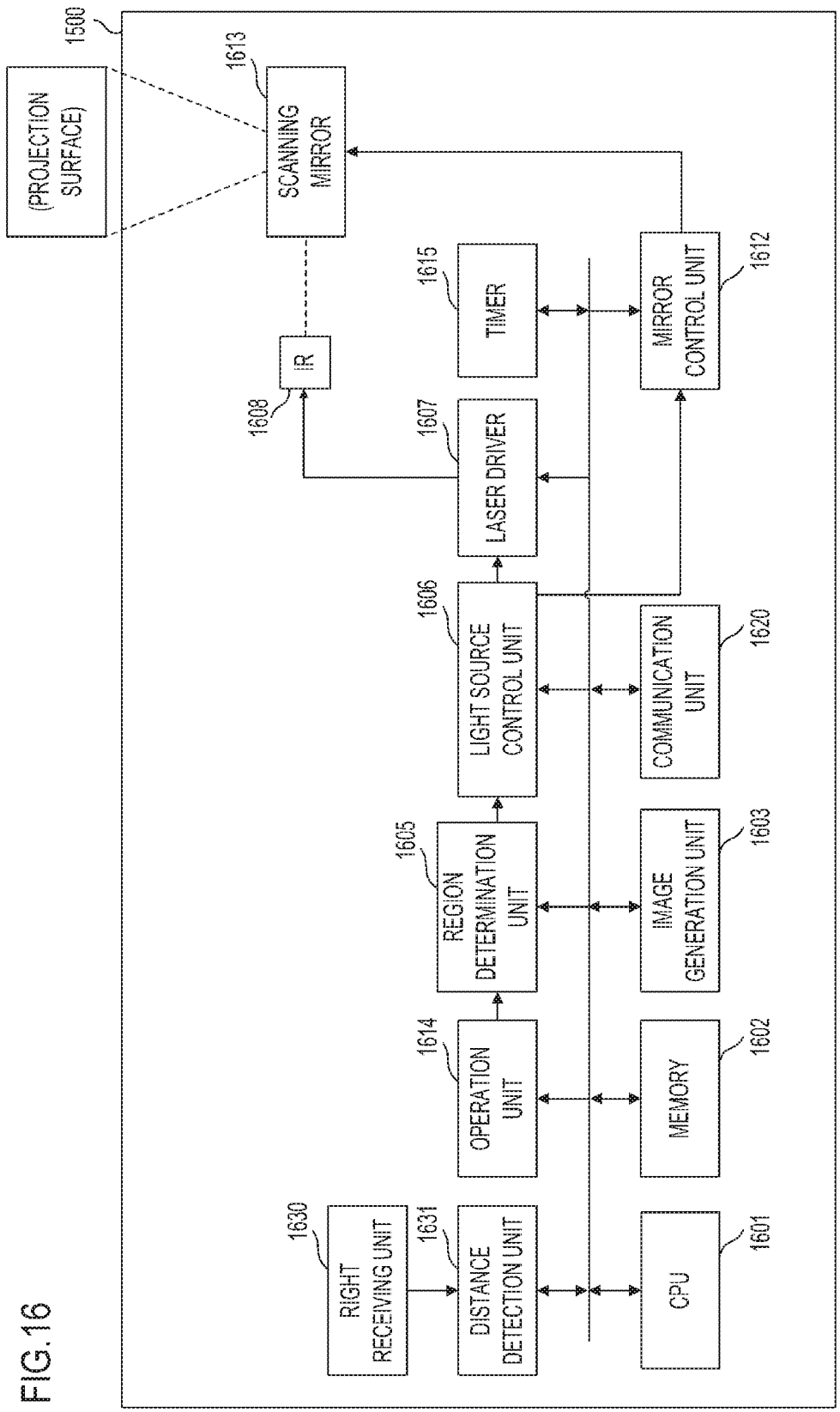
FIG. 16 is a functional block diagram depicting a detection apparatus.

FIG. 16 is a block diagram depicting the functional blocks of the detection apparatus 1500. The detection apparatus 1500 includes a CPU 1601, a memory 1602, an image generation unit 1603, a region determination unit 1605, a light source control unit 1606, a laser driver 1607, an infrared laser light source 1608, a mirror control unit 1612, and a scanning mirror 1613. The detection apparatus 1500 also includes an operation unit 1614, a timer 1615, a light receiving unit 1630 and a detection unit 1631. Each block of the detection apparatus 1500 plays a similar function to that of the equivalent block in Embodiments 1 to 5. In the following, only the differences from these equivalent blocks of Embodiments 1 to 5 will be described.

Figure 17:
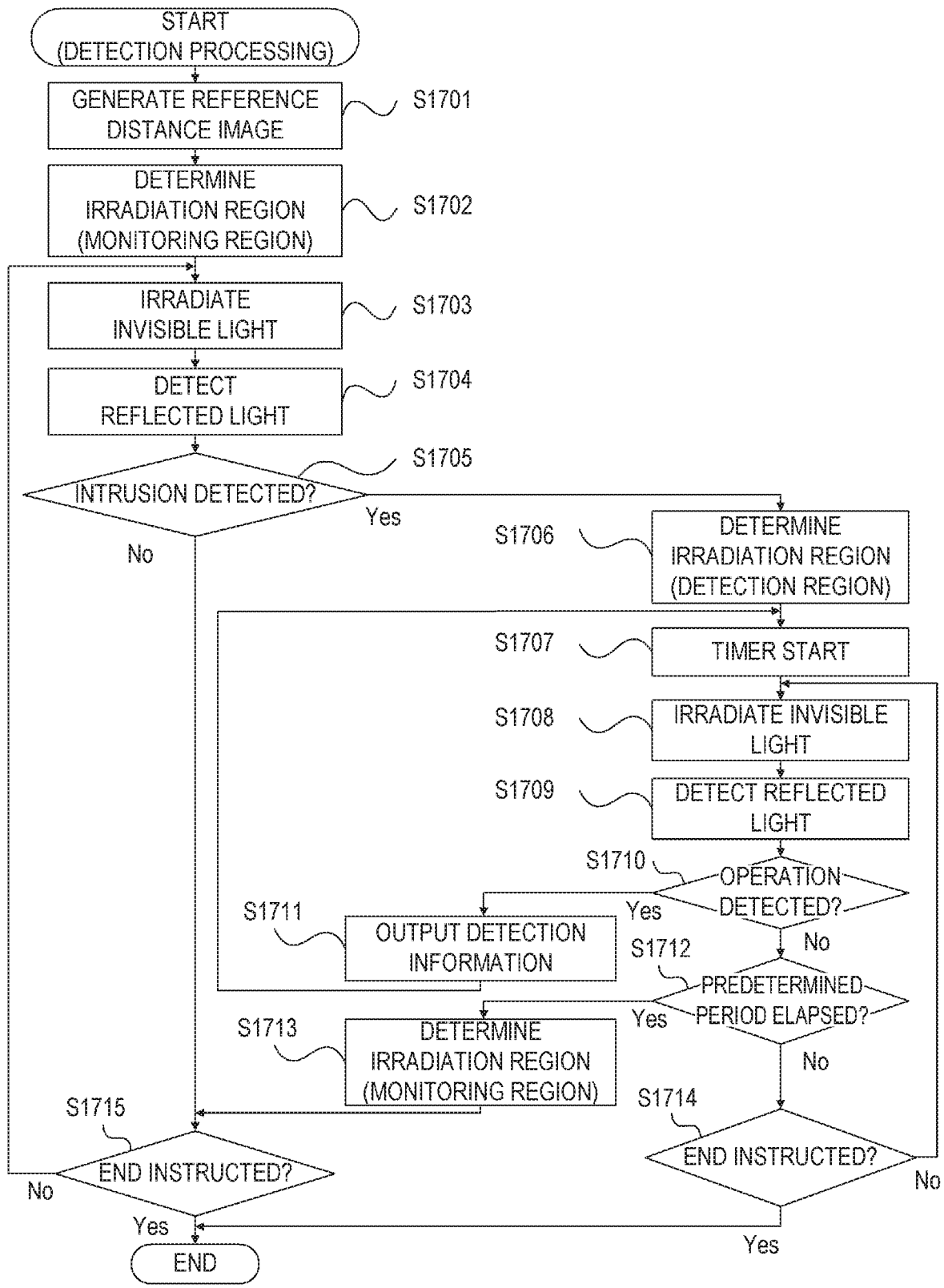
FIG. 17 is a flow chart depicting detection processing.

FIG. 17 is a flow chart depicting detection processing that starts when the detection apparatus 1500 is instructed to execute the detection processing to detect the user operation.

When the detection apparatus 1500 starts up and the user instructs execution of the detection processing by operating the operation unit 1614, the detection processing starts. Execution of the detection processing may be automatically started when the detection apparatus 1500 starts up.

In S1701, the detection apparatus 1500 generates a reference distance image. This processing is the same as the processing in S301. It is assumed that no intruding object exists between the detection apparatus 1500 and the detectable region, including the objects 1501, immediately after the detection processing is started. The region determination unit 1605 determines the entire region of the detectable region as the infrared laser light irradiation region (output region). The laser driver 1607 and the mirror control unit 1612 control the operation between the infrared laser light source 1608 and the scanning mirror 1613, so that the entire region of the detectable region is irradiated with the infrared laser light. The CPU 1601 stores the time difference between the timing when the infrared laser light was outputted and the timing when the light receiving unit 1630 received the light of the reflected wave in the memory 1602, as the reference parameter for each irradiation position.

In S1702, the region determination unit 1605 determines the irradiation region of the infrared laser light as a monitoring region (first region), which is a region to detect intrusion of the user. In the sixth embodiment, the region determination unit 1605 determines a frame region corresponding to the four sides of the detectable region, as the monitoring region.

FIG. 18A to FIG. 18E are schematic diagrams depicting the irradiation regions of the infrared laser light. FIG. 18A is a schematic diagram depicting a frame region monitoring region corresponding to the four sides of the detectable region, which is set as the region for detecting intrusion. The monitoring region may have a different shape. If the object 1501 is disposed on a wall surface, and if it is likely that the user intrudes from the left or right of the object 1501, the regions corresponding to the two sides (left and right) of the detectable region may be set as the monitoring regions. FIG. 18B is a schematic diagram depicting a frame region corresponding to the two sides (left and right) of the detectable region, that is set as the region for detecting intrusion. If it is likely that the user intrudes from the top or bottom of the object 1501, the regions corresponding to the two sides (upper and lower) of the detectable region may be set as the monitoring regions. FIG. 18C is a schematic diagram depicting a frame region corresponding to the two sides (upper and lower) of the detectable region, that is set as the region for detecting instruction. The monitoring region is at least a region that is smaller than the detectable region. The monitoring region is a region that is smaller than the later mentioned detection region (second region).

In S1703, the laser driver 1607 and the mirror control unit 1612 control the operation between the infrared laser light source 1608 and the scanning mirror 1613, so that the determined monitoring region is irradiated with the infrared laser light.

In S1704, the light receiving unit 1630 receives the infrared laser light. The detection unit 1631 compares: the time difference between the timing when the light receiving unit 1630 received the infrared laser light and the timing when the infrared laser light was outputted; and the time difference acquired in S1701, so as to detect whether the user or an object intruded. The processing in S1703 and S1704 are executed for each output of the infrared laser light.

In S1705, the CPU 1601 determines whether a user or a pointing object to input operation, such as a pointer, intruded into the monitoring region. The method of determining the intrusion is the same as S1214 and S1215. Processing advances to S1715 if no intrusion occurred, or to S1706 if intrusion occurred. The CPU 1601 may be regarded as a detection unit that detects intrusion of an individual or an object by detecting the invisible light.

In S1715, the CPU 1601 determines whether an end instruction, to end the detection processing, was inputted. For example, the CPU 1601 determines that the end instruction, to end the detection processing, was inputted when the user inputted the end instruction to the operation unit 1614, or inputted a start up stopping instruction for the detection apparatus 1500. If the end instruction was inputted, the detection processing ends. Processing advances to S1703 if the end instruction, to end the detection processing, was not inputted.

In S1706, the region determination unit 1605 determines the irradiation region of the infrared laser light as the detection region. The detection region (second region) is a region to detect whether the user operation was performed, and is a region larger than the monitoring region described above.

FIG. 18D is a schematic diagram depicting an entire region of the detectable region which was determined as the detection region. In the case where information, that indicates the position of the detection target object 1501, has already been stored in the memory 1602, the region determination unit 1605 determines a region, including the detection target object 1501, as the detection region. FIG. 18E is a schematic diagram depicting a region including the detection target object 1501 determined as the detection region. In this detection flow, the entire region of the detectable region is assumed to be the detection region.

In S1707, the CPU 1601 resets the counting of the timer 1615, and starts measuring time.

In S1708, the laser driver 1607 and the mirror control unit 1612 control the operation between the infrared laser light source 1608 and the scanning mirror 1613, so that the determined detection region is irradiated with the infrared laser light.

In S1709, the light receiving unit 1630 receives the infrared laser light. The detection unit 1631 compares: the time difference between the timing when the light receiving unit 1630 received and infrared laser light and the timing when the infrared laser light was outputted; and the time difference acquired in S1701, so as to detect whether the user or an object intruded. The processing in S1708 and S1709 are executed for each output of the infrared laser light.

In S1710, the CPU 1601 determines whether there was an operation for the detection region. If an intrusion of an object is detected in a region including the object 1501, the CPU 1601 determines that an operation for the object 1501 was performed. Processing advances to S1711 if the operation is detected (S1710: Yes), or to S1712 if not (S1710: No).

In S1711, the CPU 1601 outputs the detection information corresponding to the object 1501, of which operation was detected, to other functional units or to an external apparatus via the communication unit 1620. Then processing returns to S1707.

In S1712, the CPU 1601 determines whether the elapsed time measured by the timer 1615 exceeded a predetermined threshold. Processing advances to S1713 if the elapsed time exceeded the threshold, or to S1714 if not.

In S1713, the region determination unit 1605 determines the irradiation region of the infrared laser light as the monitoring region. Description of the processing in S1713, which is the same as S1702, is omitted. After S1713, processing advances to S1715. This series of processing is processing to return to the mode of detecting intrusion of the user, by setting the irradiation region of the infrared laser light back to the monitoring region, in the case when no operation was performed for the detection region for a predetermined period, after the irradiation region of the infrared laser light is changed from the monitoring region to the detection region. In other words, this is a processing when a time out occurs due to no operation being performed.

In S1714, the CPU 1601 determines whether an end instruction, to end the detection processing, was inputted, just like S1715. If it is determined in S1714 that the end instruction, to end the detection processing, was inputted, the detection processing ends. If it is determined in S1714 that the end instruction, to end the detection processing, was input inputted, processing returns to S1708.

If it is determined that through the above mentioned series of processing that the user or a pointing object did not intrude in the detectable range, the irradiation region of the infrared laser is limited to the monitoring region, so that a detection target object can be irradiated with the infrared laser light when intrusion is detected. Thereby in a state where operation by the user or a pointing object is not likely to happen, outputting infrared laser light in a wide range can be prevented, and power consumption of the detection apparatus can be conserved.

Preferred embodiments of the present invention have been described, but the present invention is not limited to these embodiments, and may be modified and changed in various ways within the scope of the essence thereof.

Modifications

In the case where the UI image is not included in the projection image, the projection apparatus described above may project the infrared laser light to the outer frame of the projection image regardless the projection mode. This is especially effective when the projection images are switched, or when a moving image is projected. Further, in the case where the UI image is not included in the projection image, power consumption may be conserved by widening the lighting intervals of the infrared laser light by skipping. Furthermore, when the UI image is projected for the first time in a projection image not having the UI image, the infrared laser light may be projected to the outer frame portion before projecting the UI image.

In the above embodiments, a case when the projection shape of the invisible light is a rectangle was described, but the projection shape is not especially limited, and may be a circle or ellipse, for example. The projection region of the invisible light is not especially limited either, and, for example, the invisible light may be projected to only one of the upper, lower, left and right edges of the projection image, or to only the left and right edges of the projection image in the second projection mode. If the projection image is a rectangle, the invisible light may be projected to the corners. Further, in the second projection mode, the invisible light having a rectangular or elliptical shape surrounding the UI image may be projected.

In the above embodiments, a case of the projection apparatus having a mode of projecting the invisible light to the UI mage and a mode of projecting the invisible light to the outer frame (frame region) of the projection image was described, but the projection apparatus may also have a projection mode of projecting the invisible light to the entire projection image. Thereby the projection region of the invisible light can be switched between the outer frame of the projection image and the entire projection image, or the projection region of the invisible light can be switched between the UI image and the entire projection image, for example. Further, the projection apparatus may include all of these three modes.

In the first to sixth embodiments, the infrared laser light (invisible light) is used as the light to detect an operation, but the color (wavelength) of the light used for the detection is not limited to this. For example, laser light other than the infrared light, which has a peak wavelength within a range (region) of wavelengths of the invisible light, may be used, or laser light of which peak wavelength is in the wavelength range of the visible light may be used.

The concept of the embodiments can be applied to a detection apparatus that radiates a high frequency electromagnetic wave, referred to as a "radio frequency", and detects a user or a pointing object based on the reflected wave thereof. In concrete terms, at least a part of the outer periphery of the detection region is set as the irradiation region for detecting intrusion (monitoring region). Then in a state of irradiating a high frequency electromagnetic wave to the monitoring region, the irradiation region is changed in response to the detection of the intrusion of an object in the monitoring region. The irradiation region after the change may or may not include the monitoring region. The irradiation region after the change is a region which includes the predetermined detection target object. Not only the irradiation region, but also the wavelength of the irradiation light (electromagnetic wave) may be changed before and after intrusion in the monitoring region. For example, irradiation of an RF electromagnetic wave may be changed to infrared light after intrusion in the monitoring region is detected.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplar) embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-175325, filed on Sep. 19, 2018 and Japanese Patent Application No. 2019-107221, filed on Jun. 7, 2019, which are hereby incorporated by reference herein in their entirety.

What is claimed is:

1. A control apparatus comprising:
    a determination unit configured to determine a target region;
    an output unit configured to output a predetermined light to the target region;
    a detection unit configured to detect intrusion of an object to the target region by detecting the predetermined light,
    a projection unit configured to project an image to a projection region on a projection surface using visible light,
    wherein, in accordance with the intrusion of an object to a first target region being detected by the detection unit in a state of outputting the predetermined light to the first target region, the determination unit switches the target region to a second target region from the first target region wherein the second target region includes at least one operation object,
    wherein the first target region is a region corresponding to at least a part of an outer frame of the projection region, and
    wherein the second target region is a region, within the projection region, corresponding to the operation object included in the image.

2. The control apparatus according to claim 1, wherein the predetermined light is invisible light which has a peak wavelength within a range of wavelengths of invisible light.

3. The control apparatus according to claim 1, wherein the first target region is a partial region on an outer periphery of a region including the operation object.

4. The control apparatus according to claim 1, further comprising:
a position acquisition unit configured to acquire a position of a user interface (UI) within the image projected by the projection unit,
wherein the determination unit is further configured to determine the region to which the UI is projected as the second target region.

5. The control apparatus according to claim 1, wherein the second target region is larger than the first target region.

6. The control apparatus according to claim 1, wherein when the at least one operation object is operated by the object, the operation of the operation object is detected by the detection unit in a state of outputting the predetermined light to the second target region.

7. The control apparatus according to claim 4, further comprising:
a generation unit configured to generate image data including the UI,
wherein the position acquisition unit is further configured to acquire the position of the UI based on the image data generated by the generation unit.

8. The control apparatus according to claim 4, further comprising:
a receiving unit configured to receive image data from an external apparatus,
wherein the position acquisition unit is further configured to acquire the position of the UI based on the image data.

9. The control apparatus according to claim 4, further comprising:
a receiving unit configured to receive the image data and the position information of the UI corresponding to the image data from an external apparatus,
wherein the position acquisition unit is further configured to acquire the position information received by the receiving unit as the position information of the UI.

10. The control apparatus according to claim 1, further comprising:
a processing unit configured to execute predetermined processing, in accordance that the intrusion of an object to the second target region is detected by the detection unit in a state of outputting the predetermined light to the second target region.

11. A control apparatus comprising:
a determination unit configured to determine a target region;
an output unit configured to output a predetermined light to the target region;
a detection unit configured to detect intrusion of an object to the target region by detecting the predetermined light,
wherein, in accordance with the intrusion of an object to a first target region being detected by the detection unit in a state of outputting the predetermined light to the first target region, the determination unit switches the target region to a second target region from the first target region wherein the second target region includes at least one operation object; and
wherein the detection unit is further configured to detect the intrusion of an object to a region to which the output unit outputs the predetermined light on the basis of a time difference between a timing when the output unit outputted the predetermined light and a timing when the detection unit detected the predetermined light.

12. The control apparatus according to claim 11, wherein the determination unit is further configured to determine the first target region, in accordance that the intrusion of the object to the second target region is not detected by the detection unit for at least a predetermined time in a state of outputting the predetermined light to the second target region.

13. A control method comprising:
determining a target region;
outputting a predetermined light to the target region;
projecting an image to a projection region on a projection surface using visible light;
detecting intrusion of an object to the target region by detecting the predetermined light; and
in accordance that the intrusion of an object to a first target region is detected in a state of outputting the predetermined light to the first target region, switching the target region to a second target region from the first target region wherein the second target region includes at least one operation object,
wherein the first target region is a region corresponding to at least a part of an outer frame of the projection region, and
wherein the second target region is a region, within the projection region, corresponding to the operation object included in the image.

14. A non-transitory computer readable medium that stores a program, wherein the program causes a computer to execute: a control method comprising:
determining a target region of predetermined light;
outputting a predetermined light to the target region;
projecting an image to a projection region on a projection surface using visible light;
detecting intrusion of an object to the target region by detecting the predetermined light; and
in accordance that the intrusion of an object to a first target region is detected in a state of outputting the predetermined light to the first target region, switching the target region to a second target region from the first target region wherein the second target region includes at least one operation object,
wherein the first target region is a region corresponding to at least a part of an outer frame of the projection region, and
wherein the second target region is a region, within the projection region, corresponding to the operation object included in the image.

* * * * *